(12) United States Patent
Morin et al.

(10) Patent No.: US 12,051,514 B2
(45) Date of Patent: *Jul. 30, 2024

(54) REACTOR AND SAFETY METHOD FOR A REACTOR FOR THE EVENT OF A MELTDOWN OF THE CORE

(71) Applicant: COMMISSARIAT A L'ENERGIE ATOMIQUE ET AUX ENERGIES ALTERNATIVES, Paris (FR)

(72) Inventors: Franck Morin, Aix en Provence (FR); Gilles Avakian, Marseilles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 324 days.

This patent is subject to a terminal disclaimer.

(21) Appl. No.: 17/443,991

(22) Filed: Jul. 29, 2021

(65) Prior Publication Data

US 2022/0037043 A1  Feb. 3, 2022

(30) Foreign Application Priority Data

Jul. 29, 2020 (FR) ..................... 20 08046

(51) Int. Cl.
*G21C 15/18* (2006.01)
*G21C 9/00* (2006.01)
*G21C 15/12* (2006.01)

(52) U.S. Cl.
CPC ............. *G21C 15/18* (2013.01); *G21C 15/12* (2013.01); *G21C 9/00* (2013.01)

(58) Field of Classification Search
CPC .......... G21C 15/18; G21C 9/00; G21C 9/016; G21C 9/04; G21D 1/006; F22B 37/46; F22D 11/003
See application file for complete search history.

(56) References Cited

U.S. PATENT DOCUMENTS 3,919,940 A * 11/1975 Ploger ....................... F42D 3/00
29/421.2
3,927,791 A * 12/1975 Hershberger ........... F22B 37/46
122/504.1

(Continued)

FOREIGN PATENT DOCUMENTS

CN    104167229 B    3/2017
EP    0 907 187 A1    4/1999

(Continued)

OTHER PUBLICATIONS

French Preliminary Search Report issued Apr. 28, 2021 in French Application 20 08046 filed on Jul. 29, 2020, 9 pages (with English Translation of Categories of Cited Documents & Written Opinion).

*Primary Examiner* — Sharon M Davis

(74) *Attorney, Agent, or Firm* — Oblon, McClelland, Maier & Neustadt, L.L.P.

(57) ABSTRACT

A safety method for a reactor including a primary circuit and a secondary circuit fluidly isolated from the primary circuit, and a steam generator, and in the event of a meltdown of the core of the reactor with the formation of a corium bath in a bottom of the vessel and the formation of a liquid metallic layer at the surface of the corium bath, the method includes: a break-up by explosion of the fluidic insulation to set the secondary circuit in fluidic communication with the primary circuit so that the secondary fluid follows the primary circuit to flow inside the vessel over the liquid metallic layer of the corium bath.

15 Claims, 12 Drawing Sheets

(56) References Cited

U.S. PATENT DOCUMENTS

| | | | | |
|---|---|---|---|---|
| 4,692,297 A | * | 9/1987 | Schlonski | F22B 37/46 |
| | | | | 376/250 |
| 5,652,775 A | * | 7/1997 | Grosmaire | G21C 17/003 |
| | | | | 376/280 |
| 2012/0328067 A1 | * | 12/2012 | Kurita | G21C 13/02 |
| | | | | 376/280 |
| 2017/0154692 A1 | * | 6/2017 | Seong | G21C 15/28 |

FOREIGN PATENT DOCUMENTS

| | | | | | |
|---|---|---|---|---|---|
| EP | | 3067895 A1 | * | 9/2016 | G21C 15/18 |
| WO | WO 2009/053322 A1 | | | 4/2009 | |

* cited by examiner

REACTOR AND SAFETY METHOD FOR A REACTOR FOR THE EVENT OF A MELTDOWN OF THE CORE

DOMAIN OF THE INVENTION

The invention relates to the field of safety of nuclear plants and more particularly the management of serious accidents of pressurised water nuclear reactors (PWR). Still more specifically, the present invention applies to the management of accidents involving the formation of a corium bath at the vessel bottom, following a serious accident occurrence situation, in the context of a strategy for keeping or retaining the corium in the vessel.

TECHNOLOGICAL BACKGROUND

A PWR-type nuclear plant is illustrated in FIGS. 1 and 2.

In general, such a plant comprises a containment enclosure 600 inside which the reactor 1 is housed. The reactor 1 comprises a vessel 10 forming, together with a cap 20, a tight enclosure. This tight enclosure accommodates the fuel assemblies of the core 30. In FIG. 2, for clarity, the core is represented by an area in dotted lines.

The vessel 10 further comprises at least one so-called cold fluid inlet 13, connected to a primary circuit 100 and at least one so-called hot outlet 14, also connected to the primary circuit 100. Pressurised water circulates in the primary circuit 100.

Thus, during normal operation of the reactor 1, the primary circuit 10 ensures the transport of heat from the core 30 towards a secondary circuit 200 inside which water also circulates.

The secondary circuit 200 comprises one and preferably several steam generator(s) 210. The heat exchange between the primary circuit 100 and the secondary circuits 200 is done inside the steam generators 210. In the example illustrated in FIG. 1, a loop 214 of the primary circuit 100 is illustrated in the steam generator 210.

The simplified diagrams of FIGS. 1 and 2 illustrate other perfectly classical elements of a primary circuit 100 and of a reactor 1 core 30 such as: control rods 40, a hydraulic pump 102 at the vessel 10 inlet to make water circulate in the primary circuit 100, a pressuriser 110 at the vessel 10 outlet, a containment enclosure 600, and structures forming a sill 601 and walls 602 delimiting a vessel 10 well 603.

Still during normal operation of the reactor 1, upon its passage into the steam generator 210, a portion of the water of the secondary circuit 200 vaporises and reaches an energy conversion device such as a turbine 220 movably driven by the depressurisation of the steam. Afterwards, the mechanical energy at the output of the turbines 220 is transformed into electrical energy by generators 500 and transformers 510 before being conveyed towards the consumption sites.

At the outlet of the turbines 220, the fluid condenses in a condenser 230 before being injected again in the steam generators 210 by a pump 240.

In order to condense the steam derived from the turbines 220, the condenser 230 is cooled down by an open circuit 300 fed by a water source 310 such as a river. This circuit 300 also comprises lift pumps 320, 330 and a cooling tower 340.

As it clearly appears in the diagram of FIG. 1, the water of the primary circuit 100 is intended to extract calories generated by the reactor 1 in order to transfer them to the secondary circuit 200, to transform them into electricity using an energy conversion system such as a turbo-generator. During normal operation, the core 30 is critical, and the produced thermal power is evacuated by the primary circuit 100. Monitoring of the criticality of the core is ensured by the position of the control rods 40 in the core 30, but also by a content of water-soluble boron in the water of the primary circuit.

Different accidental scenarios such as a large breach type primary coolant loss accident, combined with aggravating factors such as a failure of the classified emergency systems, could lead to a serious accident occurrence situation.

Henceforth, it follows that the core 30 switches into a meltdown state with the generation of corium. Corium is a partial or total set of molten fuels of vessel internals 10 in the molten state. The corium flows by gravity into the bottom 12 of the vessel 10 and forms a bath therein. Hence, the corium includes all or part of the molten fuel stock, containing all solid fission products and the residual thermal power associated thereto.

FIGS. 3A to 3C illustrate, in a very schematic way, a serious accident of a PWR vessel with the formation of a corium bath and then piercing of the vessel.

In FIG. 3A, the disaggregation and the partial meltdown of the core 30, the formation of corium 70 and the apparition of a corium 70 bath 71 at the vessel 10 bottom 12 are illustrated. In a known manner, upon the formation of the corium 70 bath 71, a surface liquid metal layer 72 appears at the free surface of the bath 71. A portion of the thermal power of the corium 70 bath 71 is transmitted to this layer 72.

FIG. 3B illustrates, in a very schematic way, the apparition of this metallic layer 72 (whose thickness is intentionally exaggerated for clarity). The area bearing the reference A illustrates the beginning of piercing of the vessel 10 by the metallic layer 72. This piercing of the vessel 10 is caused by a phenomenon commonly called "focusing effect". The metallic layer 72 is a good heat conductor and absorbs a large portion of the thermal energy of the corium bath 71. The focusing effect corresponds to a situation in which the metallic layer 72 transfers a portion of its heat by conduction over a small surface of the lateral walls 11 of the vessel 10. This thermal power focusing on a small surface could result in piercing of the walls 11 of the vessel 10.

FIG. 3C illustrates the completion of piercing of the vessel 10. The corium 70 then spills out in the vessel 10 well 603. Moreover, upon direct contact between the corium and the cooling water contained in the well 603, explosions, called steam explosions (abrupt depressurisation of water and expansion of steam), and the creation of hydrogen. These consequences are unacceptable given the risk of break-up of the third containment barrier formed by the reactor enclosure 600. The risk of vessel piercing, in a soaked vessel 10 well 603 situation, shall be eliminated. In addition, it is essential to avoid uncontrolled dispersals of corium 70, a highly radioactive material having a very high thermal power. A dispersal of corium 70 at the sill 601 level generates a risk of piercing of the latter and a propagation down to potential phreatic areas.

There are two modes of management of the corium in the event of a Serious Accident in a PWR depending on the designers of the PWER nuclear boiler. A first range of solutions, referred to as Ex Vessel Retention, consists in letting the corium 70 pierce the vessel 10, with the primary circuit depressurised, and flow in an area intended for spreading of the corium and for the management of cooling thereof. This type of solutions has the drawback of requiring an impressive platform for the reception and spreading of corium called recuperator, which considerably weighs down the structure to be built and the infrastructure cost of the reactor enclosure. Another major drawback relates to the demonstration of integrity of the third containment barrier formed by the reactor enclosure, to avoid the contamination of the environment, since the containment barrier formed by the primary circuit has been broken.

A second range of solutions, referred to as In Vessel Retention or by its acronym IVR, consists in deploying systems for keeping the corium 70 inside the vessel 10 by avoiding piercing of the latter.

In this range of solutions, one strategy aims to keep the corium 70 in the vessel 10 and to extract its residual power through the wall of the vessel 10 by means of an external cooling, in particular through the set-up of a (natural or forced) convection loop, after soaking of the vessel 10 well 602.

This type of solutions is described for example in the document WO2009/053322. In this document, a pump located at the bottom of the vessel allows increasing the forced convection of water located in the vessel well 603 in contact with the outer wall of the vessel 10.

A natural circulation of water in contact with the vessel, and then vaporised and condensed again at the upper portion of the enclosure may also be set up. This type of solutions is suggested for managing the evacuation of the residual power in the event of a serious accident in the AP1000 reactor of the company Westinghouse™. This cooling means is completely passive, in contrast with the solution described in the document WO2009/053322.

Moreover, depending on the considered assumptions regarding the thickness of the metallic layer 72 at the origin of the focusing effect, the likelihood of not reaching sufficient cooling performances to avoid piercing of the vessel still remains. That is why in general, even in the context of an IVR management of the serious accident, complementary devices for treating the hydrogen risk, and a study on the limitation of the consequences of the steam explosion is described, with additional means provided, in order to treat the worst-case assumption of vessel piercing.

An IVR strategy, described in the document FR2763168 or EP0907187 consists in providing a device for recovering the corium at the bottom of the vessel. The corium flows by gravity from the core up to this recuperator. Moreover, it is provided for an injection of water by gravity by an additional tank connected to the vessel well.

This solution has the drawback of requiring the presence of an additional system formed by the recuperator, which weighs down and substantially enlarges the size of the reactor vessel. In addition, the means for injecting water into the vessel formed by the tank directly connected to the primary circuit are only but a backup injection means complementary to those already present for the treatment of sizing accidents. The residual primary pressure prevailing upon the occurrence of the serious accident requires providing for a considerable gravity height of this tank, which considerably weighs down the structure to be built.

Consequently, all of the few solutions that have been suggested to manage cooling of the corium have drawbacks. There is a need for providing a solution limiting, and possibly suppressing, at least some of these drawbacks. The present invention aims such an objective.

Another objective of the present invention consists in reducing, and possibly eliminating, the risk of piercing of the vessel by focusing effect.

SUMMARY

To achieve at least one of these objectives, the present invention provides for a safety method for a pressurised water nuclear reactor for the event of a meltdown, at least partially, of a core of the reactor with the formation of a corium bath, the reactor comprising, during an operation phase, at least:
- a primary circuit in which a water-based primary fluid is intended to circulate, the primary circuit being configured so that the primary fluid penetrates into a vessel of the reactor and crosses the core contained within the vessel in order to extract heat produced by the core,
- a secondary circuit, in which a water-based secondary fluid is intended to circulate, the secondary circuit being fluidly isolated from the primary circuit, and comprising at least one steam generator, the secondary circuit being configured so as to absorb heat from the primary circuit and transform it, at least partially, into steam in the steam generator.

The method comprises at least the following step in response to a detection of an event characterising a meltdown, at least partially, of the core of the reactor with the formation of a corium bath in a bottom of the vessel and with the formation of a liquid metallic layer at the surface of the corium bath:
  break-up by explosion of the fluidic insulation to set the secondary circuit in fluidic communication with the primary circuit so that the secondary fluid follows the primary circuit to flow inside the vessel over said liquid metallic layer of the corium bath.

Thus, the pressurised secondary fluid, typically water at saturation pressure and temperature, contained in the secondary circuit and in particular in the steam generator(s) flows into the bottom of the vessel over the metallic layer.

Hence, this coolant injection is performed in a passive way since the water of the secondary circuit is at a higher pressure than that of the primary circuit.

Typically, the pressure of the water contained in a steam generator is in the range of 60 to 70 bars, while that of the primary circuit is typically lower than 20 bars when a Serious Accident situation occurs.

In a very short time, the water of the secondary circuit starts coming into contact with the overmelting liquid metal layer causing a drastic reduction of the heat flow at the origin of the piercing by focusing effect. All or part of the water from the secondary circuit vaporises on contact with the liquid metal layer and with the corium bath, by running off along the reactor vessel on the cold branch side, advantageously along a volume commonly called downcomer.

Water from the secondary circuit flows over a period that is long enough to cool down the liquid metal layer at least over the entire period during which this liquid metal layer has a thickness that is small enough to generate a risk of piercing of the vessel. Thus, it is possible to consider this flow as monitored. However, the flow rate of the flow flowing over the liquid metallic layer has not to be very high.

One way for managing this flow rate and this duration of water injection from the secondary circuit into the vessel consists in accurately calibrating the section of the opened breach(es) between the secondary circuit and the primary circuit.

As a non-limiting example, the flow rate of secondary water coming into the vessel is that corresponding to a breach with a diameter of about 20 mm and more generally between 10 and 30 mm.

All of the water contained in one or several steam generator(s) (GV) then progressively flows into the reactor vessel. The typical value of the liquid flow rate coming into the primary circuit from the secondary circuit is about 5 kg/s. As a non-limiting example, this flow rate is more generally comprised between 2 kg/s and 10 kg/s. This value is drastically lower than all safety injections intended to soak the core. Thus, the method according to the invention allows for a long duration of transfer of water from the GV towards the area of a potential piercing of the vessel by focusing effect, but also for a significant limitation of the steam created by the water/liquid metal interaction, which limits overpressure in the primary circuit.

Also as a non-limiting example, the duration of water injection from the secondary circuit into the vessel is in the range of three hours and more generally between 30 min and 5 hours. For comparison, in a solution that would consist in soaking the core by pouring water from the secondary circuit into the vessel, the duration of injection would last from about one minute to a few minutes.

Depending on the accidental scenarios, the available amount of water per steam generator varies between 29 tons and 70 tons per steam generator for a reactor having a power of 1300 MWe (the French Palier N4 type).

With regards to the time scale of a serious accident and more particularly with regards to the time scale of the meltdown of the core and of the formation of corium, the time during which water from the secondary circuit flows over the corium bath is short when implementing the method according to the invention.

Nevertheless, in the context of development of the present invention, it has been observed that this duration is sufficient to quite significantly reduce, and even to eliminate, the risk of piercing of the vessel by focusing effect.

Indeed, it has been noticed that the time period during which the focusing effect could cause piercing of the vessel is relatively limited. It has been observed that the risk of piercing due to the focusing effect corresponds to a time interval where the corium bath has a liquid metallic layer at the surface with a relatively small thickness, typically of few centimetres. In this configuration, a large portion of the thermal power derived from the corium bath is transmitted to this thin metallic blanket, which power is then transmitted by contact to the inner wall of the vessel, and induces the progressive piercing of the latter.

Over time, the corium bath continues to be fed by the inner elements of the vessel which progressively melt down, and the liquid metal layer at the surface thickens, because of the stock of molten metal that increases. The contact surface between the liquid metal layer and the inner wall of the vessel increases. The thermal power transmitted to this later is then distributed across a larger thickness of the liquid metallic layer, and the vessel piercing power is then less concentrated. The risk of vessel piercing then becomes lower.

Once all of the inner metal stock has molten, the thickness of the surface metallic layer is then such that the thermal power at the periphery and in contact with the vessel is no longer sufficient to pierce the vessel. In general, at this level, the external cooling of the vessel is sufficiently effective to evacuate the thermal power derived from the bath. Piercing of the vessel is then definitely stopped.

For example, if 3 MWth are transmitted to a metallic layer with a thickness of 10 cm and with a periphery of 12 m, without any possibility for thermal evacuation by the upper surface, then there would be a heat flow applied to the vessel of $3/1.2=2.5$ mw/m$^2$. Such a flow cannot be evacuated by conventional external cooling when the vessel is drowned in a soaked vessel well. The excess thermal power transmitted to the vessel is then transformed into a melting heat of the vessel itself and piercing of the vessel occurs from inside. Once the liquid metallic layer reaches a doubled or tripled thickness, the flow is then reduced by so much and the external cooling then becomes sufficient to stop the progress of piercing of the vessel since the entire thermal power derived from the bath is evacuated up to the external water, without causing a meltdown of the vessel metal.

When the secondary liquid water comes into contact with the liquid metal layer from the cold branches of the primary circuit, preferably at the location of piercing of the vessel, that is to say at the periphery of the downcomer as will be described in detail later on, each kilogram of water per second that evaporates induces a cooling of the liquid layer by about 2 to 3 MWth. With a flow rate of about 5 kg/s over a period of about 3 hours, cooling of the liquid metal layer corresponds to an evacuation of thermal power of about 10 to 15 MWth over three hours, which drastically reduces and even prevents piercing of the vessel.

In addition, once the corium bath reaches a given height, the liquid metal layer at the surface comes into contact with the core support plate, illustrated in FIGS. 2 and 3A by the reference 17. The temperature of the liquid metal overheated by the thermal power of the corium bath is then drastically reduced by the significant meltdown of the lower portion of the core support plate. Indeed, the melting point of the metal is well below that which is likely to be reached by the liquid metal layer thereby causing the focusing effect.

Thus, in the context of the development of the present invention, it has been noticed that it was possible to effectively fight piercing of the vessel by focusing effect by injecting an amount of water at a relatively low flow rate inside the vessel. The volume of water contained in the steam generators is then large enough to effectively cool down the liquid metal layer over the entire period during which the liquid metal layer has a thickness that is small enough for the Focusing effect phenomenon to cause piercing of the vessel.

In a particularly advantageous manner, the invention does not require any additional components in the reactor, such as a recuperator, or additional systems in the vessel well, such as forced convection means.

Moreover, the invention does not require any additional tanks placed at a substantial height. Yet, by taking advantage of the pressure of the secondary circuit, the invention allows for a very quick water injection.

However, it is necessary to provide for cooling the outer wall of the vessel, in the configuration of holding the corium within the vessel, and for cooling by soaking the vessel well.

Hence, the suggested solution allows for a passive operation, that is to say without any pump to pour a coolant over the corium bath, an enhancement of the strategy for managing the corium within the vessel, by fighting the effects of the Focusing Effect likely to jeopardise the success in preventing piercing of the reactor vessel.

Moreover, the invention does not provide for additional components or for tappings directly on the reactor vessel, these might cause a reduction of the reliability of the reactor safety.

Thus, the invention allows considerably enhancing the safety of a pressurised water reactor in the event of a meltdown of the core with the formation of a corium bath.

The invention also covers a pressurised water nuclear reactor comprising at least:
 a vessel accommodating a core of the reactor, the vessel comprising at least one inlet and at least one outlet,
 a primary circuit at least one first end of which is connected to the inlet of the vessel and at least one end of which is connected to the outlet of the vessel so that a primary fluid, preferably water-base, circulating in the primary circuit penetrates into the vessel of the reactor through said inlet and comes out through said outlet while passing throughout the core in order to extract heat produced by the core, a secondary circuit, fluidly isolated from the primary circuit, in which a water-based secondary fluid is intended to circulate, and comprising at least one steam generator, the secondary circuit being configured so as to absorb heat of the primary circuit and transform it, at least partially, into steam in the steam generator.

The reactor comprises a safety system which comprises a safety device comprising at least one explosive device configured so as to explode in order to break up the fluidic insulation between the secondary circuit and the primary circuit so as to create at least one, and preferably only one passage enabling a flow inside the primary circuit of the secondary fluid present in the at least one steam generator.

Advantageously, the explosive device is configured so as to explode in the event of a meltdown, at least partially, of the core with the formation of a corium bath in a bottom of the vessel and with the formation of a liquid metallic layer at the surface of the corium bath.

Thus, the exposure of the explosive device enables the secondary fluid contained in the at least one steam generator to flow in the vessel while passing beforehand through the primary circuit.

More specifically, when the corium bath is formed and the liquid metallic layer appears at the surface of the bath, the pressurised secondary fluid contained in the steam generator spills out in the primary circuit, advantageously in the cold branch(es), and then in the vessel. This fluid cools down the liquid metallic layer, which attenuates the focusing effect phenomenon. Thus, piercing of the vessel is avoided.

$S_{breach}$ is the minimum section of said passage that enables the injection, inside the primary circuit, of the secondary fluid present in the at least one steam generator.

According to a non-limiting example, $S_{breach}$ is smaller than 20 cm² (10⁻² meters).

According to one example, $S_{breach}$ is larger than 2 cm², and preferably $S_{breach}$ is larger than 3 cm². According to one example, $S_{breach}$ is comprised between 2 cm² and 20 cm².

According to one example, $S_{breach}$ is comprised between 0.2 cm² and 20 cm², preferably 0.8 cm² and 20 cm² and still more preferably between 2 cm² and 7 cm².

The inlet section on the cold branch side of the reactor vessel is much larger than the section of the breach created between the secondary circuit and the primary circuit.

Typically, according to a non-limiting example, $S_{breach} < 0.05 * S_{inlet}$, preferably $S_{breach} < 0.01 * S_{inlet}$, preferably $S_{breach} < 0.005 * S_{inlet}$ and preferably $S_{breach} < 0.001 * S_{inlet}$, $S_{inlet}$ is the minimum section of the passage of the primary fluid in the primary circuit and up to the vessel.

If the primary circuit includes several inlets in the vessel, which is the case when there are several steam generators, then the section $S_{inlet}$ is the sum of the sections of the inlets of the primary circuit up to the vessel.

Typically, the passage section of the primary fluid on the cold branch side is in the range of 6000 cm².

Typically, when $S_{inlet}$ has a circular section, $S_{inlet}$ has a diameter comprised between 800 and 900 mm (10⁻³ meters).

Thus, the section through which the secondary fluid flows into the primary circuit is much smaller than the section through which the primary fluid usually flows in the vessel. This ratio of the sections $S_{breach}$ and $S_{inlet}$ allows injecting into the primary and therefore into the vessel a secondary fluid flow over a relatively long time period. More specifically, over a time period that is long enough to cover the duration during which the thickness of the liquid metallic layer is small enough to pierce the wall of the vessel by focusing effect.

These features allow reducing, and possibly suppressing, the risk of piercing of the vessel by focusing effect.

BRIEF INTRODUCTION OF THE DRAWINGS

The aims, objects, as well as the features and advantages of the invention will appear better from the detailed description of embodiments of the latter which are illustrated by the following appended drawings wherein:

FIG. 1 schematizes a PWR-type nuclear plant.

FIG. 2 schematically illustrates a vertical section of a PWR-type reactor vessel in its vessel well in an operating state excluding a serious accident situation.

FIGS. 3A to 3C schematically illustrate different phases of a serious accident resulting in the partial or total meltdown of the core, the formation of a corium bath and then piercing of the vessel in the reactor illustrated in FIG. 2 by focusing effect.

FIG. 4 schematically illustrates the implementation of the invention with cooling of the corium bath by injection of water from the secondary circuit through the primary circuit up to the bottom of the vessel.

FIGS. 5A and 5B schematically illustrate a PWR-type nuclear plant integrating a safety system according to a first embodiment of the invention. FIG. 5B illustrates, in an enlarged view, the hydraulic connections between the vessel and the steam generator.

Figure 1:
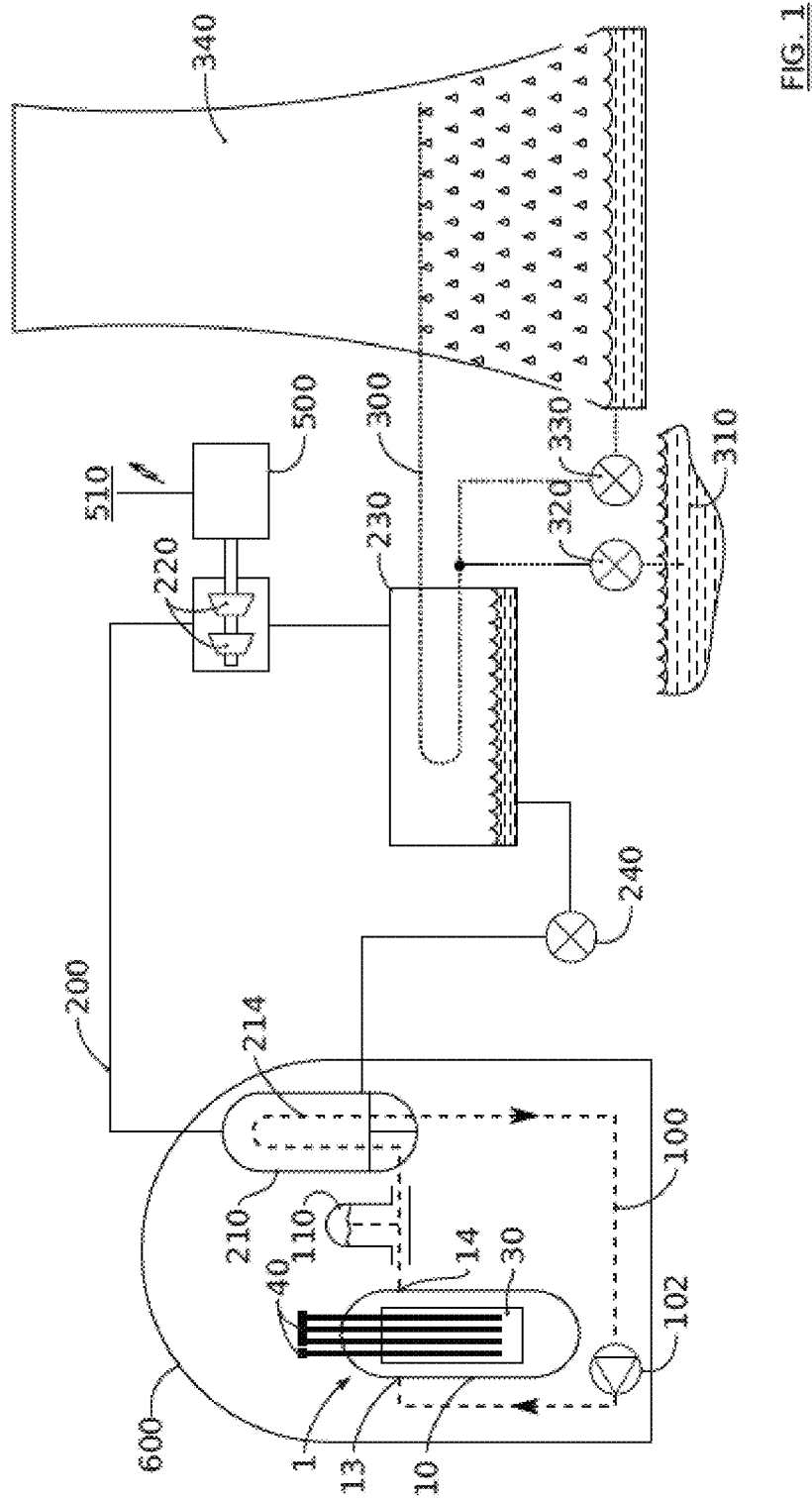

The drawings are provided as examples and do not limit the invention. They represent block diagrams intended to facilitate understanding of the invention and are not necessarily to the scale of practical applications. In particular, the relative dimensions of the different constituent elements of the plant, in particular the relative dimensions of the constituent elements of the reactors and its pipes, of the liquid metallic layer, and of the different members of the plant do not represent reality.

DETAILED DESCRIPTION

Before starting a detailed review of embodiments of the invention, it should be recalled that the invention according to its first aspect possibly comprises in particular the optional features hereinafter which could be used in combination or alternatively.

According to one example, said detection of the formation of a liquid metallic layer at the surface of the corium bath is performed using at least one fuse disposed on a wall of the vessel, the at least one fuse being configured so as to melt down when the liquid metallic layer reaches it.

According to one example, the at least one fuse has a melting temperature of the fuse higher than or equal to a temperature threshold Tf, with Tf≥400° C., preferably Tf≥500° C. and preferably Tf=600° C.

According to one example, the reactor comprises several fuses distributed according to at least one generatrix of a wall of the vessel so that two neighbouring fuses define a vessel slice, the volumes $V_{slice}$ of the slices being identical.

According to one example, setting of the secondary circuit in communication with the primary circuit is triggered according to the detection, for example using at least one fuse, of a temperature of the inner wall of the vessel higher than a temperature threshold Tf, with Tf higher than 400° C. and preferably Tf higher than 500° C.

According to one example, a profile of the evolution of the height of the liquid metallic layer in the vessel is determined by means of fuses disposed over an inner wall of the vessel and preferably disposed according to at least two generatrices of this wall. The time point at which the secondary circuit is set in fluidic communication with the primary circuit is determined according to this profile.

Preferably, a series of fuses is disposed over an inner face of the wall of the vessel. Preferably, the fuses are placed over a generatrix of the bottom of the vessel and of a lateral wall of the vessel. The progress of the corium level rise, as well as the beginning of degradation of the vessel by the liquid metal layer at the surface thereof is detected by the successive deactivation of the fuses of this generatrix. Starting from a determined corium height, the activation of the fluidic communication is activated.

According to one example, the reactor comprises at least one fuse over a wall of the vessel. The fuse is configured so that, when the liquid metallic layer reaches the fuse, it makes the latter melt down. For example, the melting temperature of the fuse is higher than or equal to a temperature threshold Tf, with Tf≥350° C., preferably Tf≥450° C. and preferably Tf=600° C.

According to one example, the reactor comprises several fuses distributed according to at least one generatrix of a wall of the vessel. The fuses are disposed along a generatrix so that if the volume of the liquid metallic layer increases at a constant rate, the time intervals separating the time points at which two successive fuses of a generatrix are reached by the liquid metallic layer remain constant.

According to one example, the secondary fluid flows inside the vessel over the liquid metallic layer at least over the entire period during which the liquid metallic layer has a thickness $e_{72}$ that is small enough to pierce at least partially an inner wall of the vessel.

According to one example, the secondary fluid flows inside the vessel over the liquid metallic layer during at least thirty minutes and preferably during at least one hour and preferably during at least two hours.

According to one example, the secondary water flow runs in the primary circuit throughout a passage whose minimum section $S_{breach}$ is comprised between 0.2 cm² (0.2·10⁻⁴ m²) and 20 cm² and preferably between 0.8 cm² and 7 cm². If the minimum section $S_{breach}$ of this passage is circular, then its diameter is comprised between 5 and 50 mm and preferably between 10 and 30 mm. Typically, this diameter is about 20 mm.

According to one example, the secondary fluid flows inside the vessel (10) with a flow rate lower than 10 kg/s (10³ grams/second) and preferably lower than 7 kg/s.

According to one example, the reactor comprises an inner envelope, located inside the vessel, enveloping the core and defining with an inner wall of the vessel an annular volume called downcomer, the downcomer being configured so that, during the normal operation of the reactor:

the inlet opens into the outside of the envelope and into the downcomer so that the primary fluid coming from the inlet is guided up to the bottom of the vessel, the outlet opens into the inside of the envelope so that the primary fluid present in the core could come out of the reactor through the outlet.

The reactor is configured so that when the explosive device creates the at least one passage suppressing the fluidic insulation between the secondary circuit and the primary circuit, the secondary fluid contained in the steam generator then flows in a bottom of the vessel while passing beforehand through said inlet of the vessel and then through the downcomer.

This embodiment promotes a run-off of the secondary water over the inner walls of the vessel. This allows cooling down the liquid metallic layer even more effectively than in the case where the secondary fluid penetrates into the vessel from the outlet of the latter, or on the hot branch side, and therefore without passing through the downcomer. Indeed, by running off on the downcomer side, the evaporation of the secondary water, and therefore cooling of the liquid metal layer, takes place in the area where piercing of the vessel is located. To reach this embodiment, the connection on the secondary side should be performed on the cold branch side of the steam generator, that is to say on the heat-exchanger side where the primary temperature corresponds to the cold return of the primary circuit (cold water box).

According to one example, the reactor comprises at least one fuse disposed on a wall of the vessel, the fuse being configured so that, when the liquid metallic layer reaches the fuse, it makes the latter melt down, the melting temperature of the fuse being higher than or equal to a temperature threshold Tf, with Tf≥400° C., preferably Tf≥500° C. and preferably Tf=600° C.

According to one example, the reactor comprising several fuses distributed according to at least one generatrix of a wall of the vessel, the fuses are distributed along a generatrix so that two neighbouring fuses according to this generatrix, define a vessel slice, the volumes Vslice of the slices are identical.

According to one example, the steam generator comprises an envelope enclosing the secondary fluid and the primary fluid, the envelope enclosing an insulation fluidly isolating the secondary and primary fluids, the safety system being configured so as to suppress the insulation between the secondary and primary fluids inside the envelope of the steam generator, thereby creating said passage. The suppression of this insulation corresponding to a breach with a limited and monitored diameter (typically 20 mm in diameter).

According to one example, the steam generator comprises tubes inside which the primary fluid circulates, the secondary fluid being in contact with an outer wall of the tubes, the safety system comprising an explosive device including at least one explosive plug accommodated inside at least one of said tubes and a triggering device, the explosive plug being configured so as to explode, when it is triggered by the triggering device, so as to section at least the tube in which it is accommodated, thereby creating said passage. Before the explosion, the plug forms, at least partially and advantageously on its own, said fluidic insulation between the secondary and primary circuits.

According to another example, the steam generator comprises:
a first portion in which the primary fluid circulates,
a second portion in which the secondary fluid circulates, a plate with tubes fluidly isolating the first and second portions, the plate with tubes comprising at least one tube extending, at least partially, in the second portion and inside which the primary fluid circulates, the secondary fluid present in the second portion being in contact with an outer wall of the tube, the safety system comprising:

at least one communication channel between the first and second portions, the explosive device including at least:

an explosive plug accommodated inside said channel and preventing the circulation of the fluid in said channel;

a triggering device.

The explosive plug is configured so as to explode, when it is triggered by the triggering device, so as to destroy itself at least partially to enable a circulation through said channel thereby forming a passage between the first and second portions. Before the explosion, the plug forms, at least partially and advantageously on its own, said fluidic insulation between the secondary and primary circuits.

According to one example, the triggering device is configured so as to be activated from outside the steam generator.

According to one example, the triggering device comprises at least one wire crossing a wall of the envelope of the steam generator.

According to a non-limiting possibility, the triggering device comprises:

a magnetic contactor located inside the envelope of the steam generator and connected by a wire to the explosive plug, and a magnetic exciter, located outside the envelope of the steam generator, configured so as to cooperate with the magnetic contactor so that when the magnetic exciter is activated, it actuates the magnetic contactor which triggers the explosion of the explosive plug.

According to one example, the safety device is configured so that the secondary fluid contained in the steam generator flows in the vessel with a flow rate comprised between 4 and 5 kg/s for a pressure of the steam generator in the range of 68 bar.

Thus, even with the limited amount of cooling fluid, the focusing effect phenomenon could be slowed down and the piercing of the vessel could be avoided.

The terms "substantially", "about", "in the range of" means while taking into account the manufacturing and/or measurement tolerances and could in particular correspond to "within 10%".

In the following description, a normal operation of the reactor 1 or of the plant refers to an operating phase in the absence of accidents or serious accidents. An accident such as a primary coolant loss, a large breach or a very large breach accident does not represent a normal operation phase of the reactor 1.

The invention will now be described in detail with reference to FIGS. 4 to 8.

Figure 2:
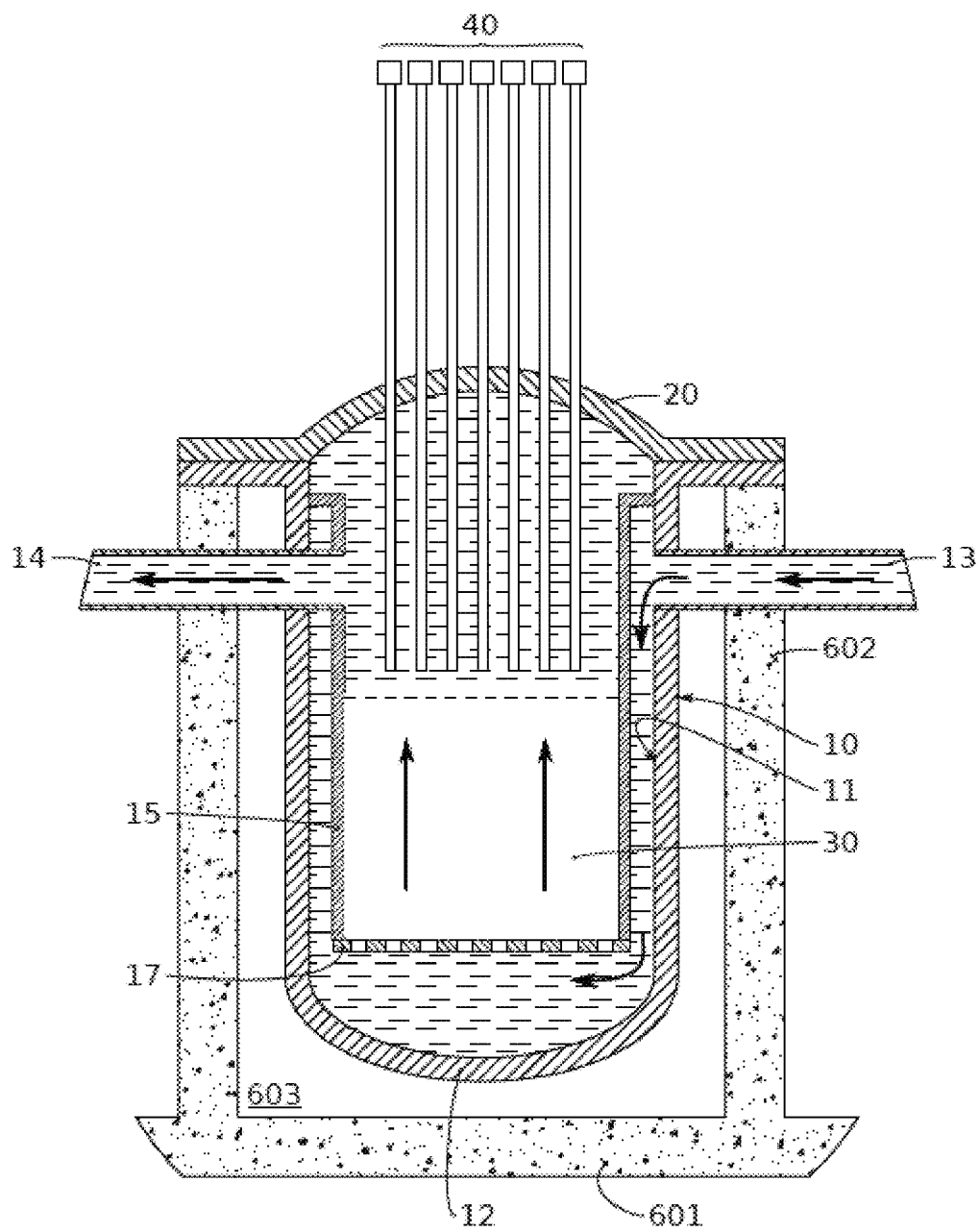
Figure 3A:
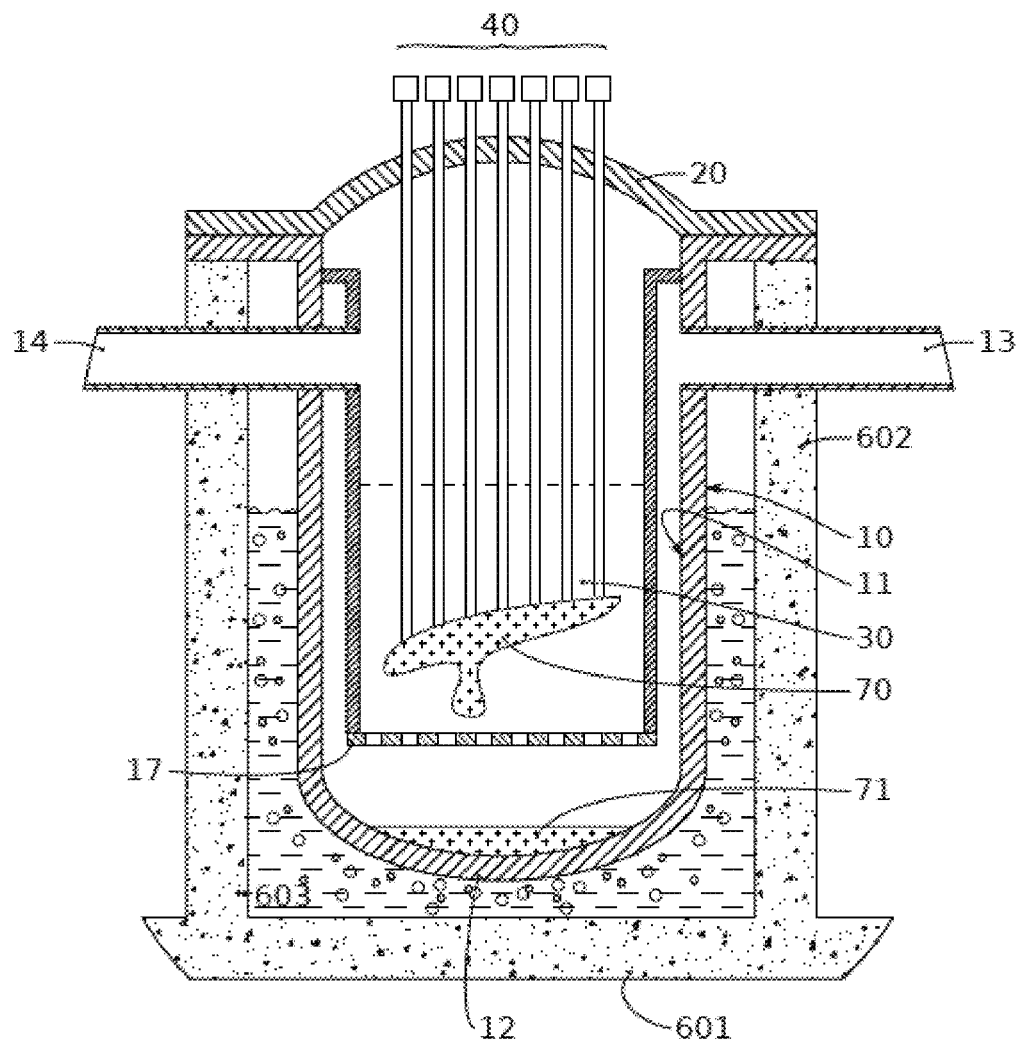
Figure 3B:
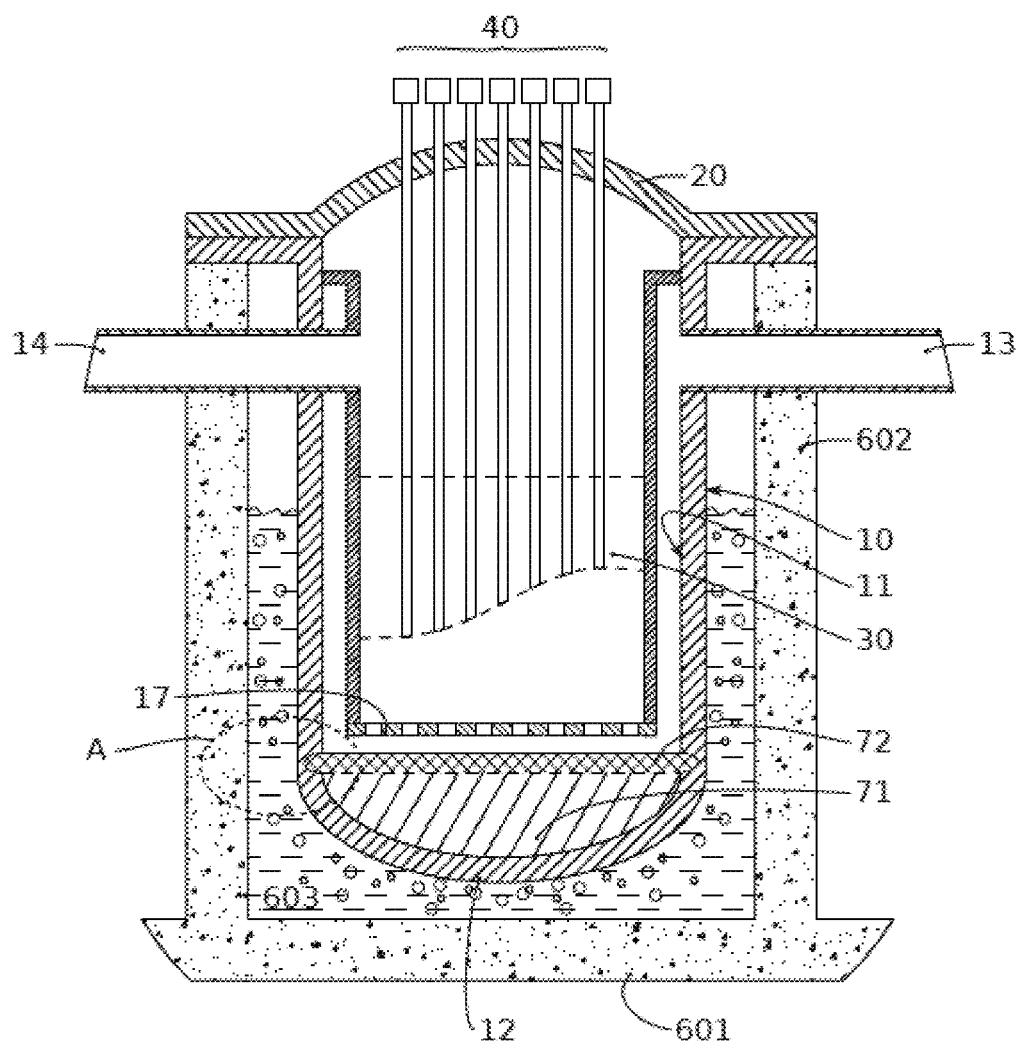
Figure 3C:
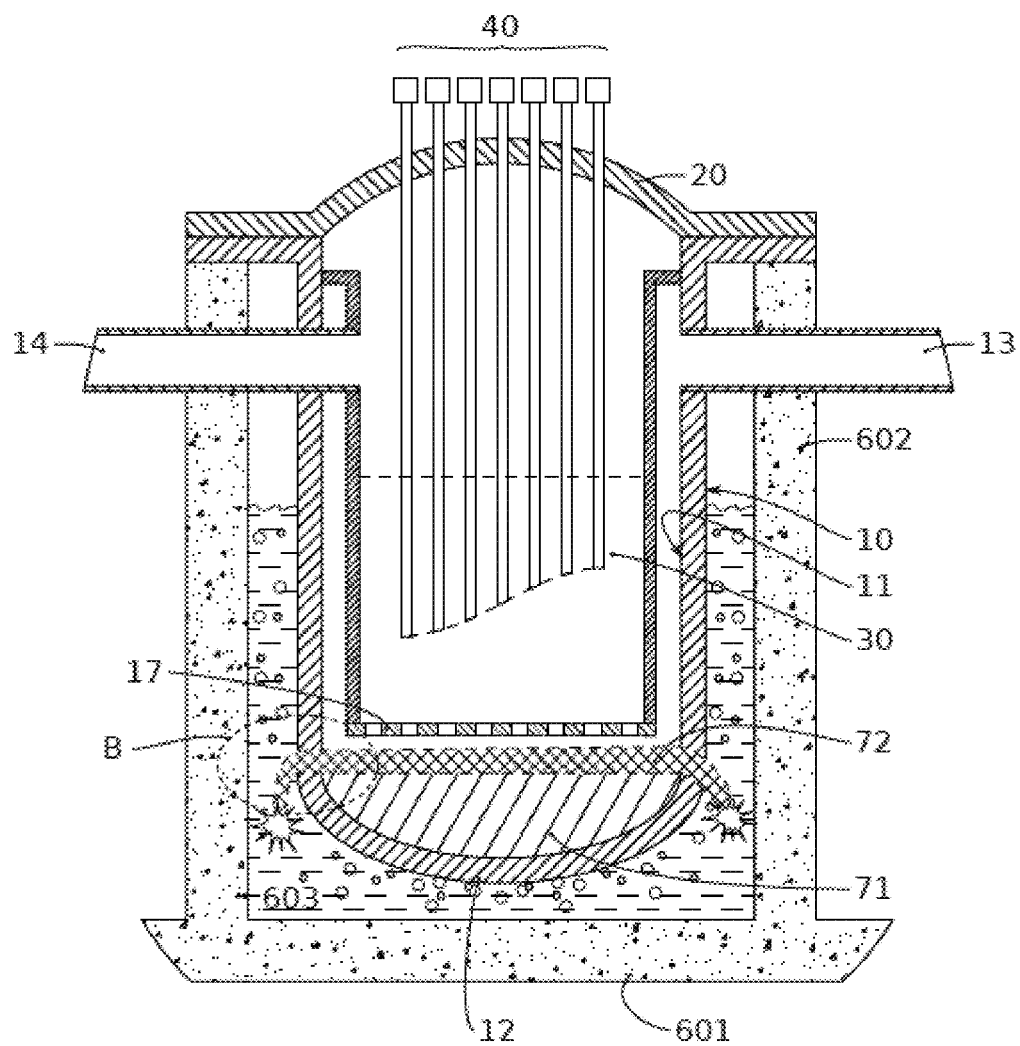
Figure 4:
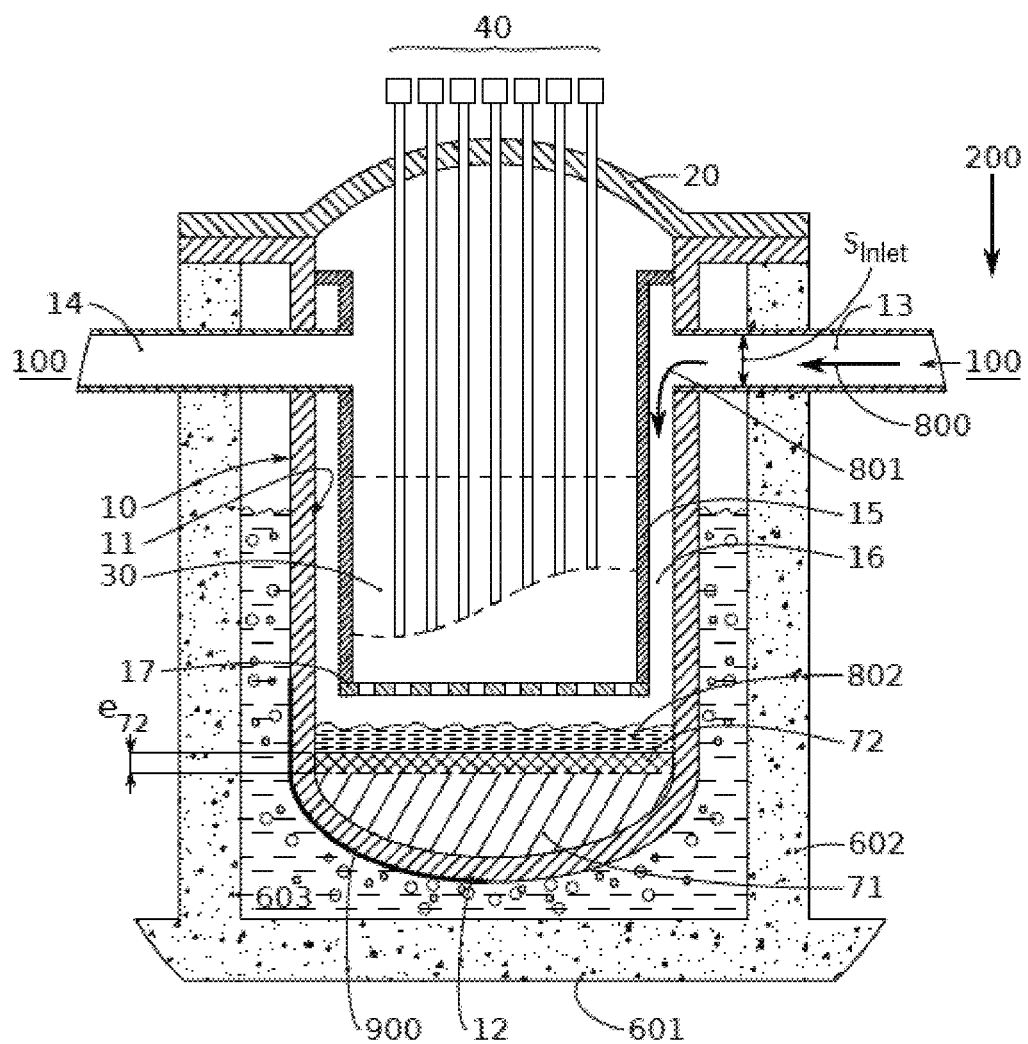

FIG. 4 illustrates a reactor 1, for example of the same type as that described with reference to FIGS. 2 to 3A.

All of the features described with reference to FIGS. 2 to 3A apply to the embodiments illustrated in FIG. 4. In this FIG. 4, the core 30 is molten or partially molten. A corium 70 bath 71 has formed in the bottom 12 of the vessel 10. At the surface of the bath 71, the liquid metal layer 72 has formed or is about to form.

Before this liquid metal layer 72 starts piercing the vessel 10 or rapidly after the beginning of this partial piercing, it is provided to pour a cooling fluid in the bottom 12 of the vessel 10, and therefore over this layer 72.

This cooling fluid arrives from the inlets 13 and/or the outlets 14 of the primary circuit 100.

As it will be explained in detail later on, this cooling fluid consists of water from the secondary circuit 200 which flows in the primary circuit 100.

It should be noted that, conventionally, in the event of a serious accident, a depressurisation of the primary circuit 100 is triggered. This may be performed by opening a specific valve located for example at the top of the pressuriser 110. This depressurisation of the primary circuit might be triggered once a threshold temperature is reached, for example a temperature of the assembly sleeve that would reach 650° C. or more. This depressurisation of the primary circuit 100 results in the latter having a pressure lower than that of the secondary circuit 200. Typically, the pressure in the depressurised primary circuit 100 is lower than 20 bars. By the effect of the pressure difference between the primary 100 and secondary 200 circuits, the communication of these circuits 100, 200 causes a quick injection of the fluid of the secondary circuit 200 into the primary circuit 100.

According to a particularly advantageous embodiment, the fluid 800 of the secondary circuit 200 spills out into the primary circuit 100 and reaches the interior of the vessel 10 through the inlet 13. Preferably, the reactor 1 comprises an inner envelope 15, located inside the vessel 10, enveloping the core 30 and defining together with the inner wall 11 of the vessel 10 an annular volume, commonly called downcomer 16 (descending portion). This inner envelope 15 is configured so that, during the normal operation of the reactor 1 (that is to say in the absence of a serious accident for example):

the inlet 13 opens into the outside of the envelope 15 and into the downcomer 16 so that the cold fluid coming from the inlet 13 is guided up to the bottom 12 of the vessel 10, the outlet 14 opens into the inside of the envelope 15 so that the hot fluid present in the core 30 could come out of the reactor 1 through the outlet 14.

Thus, during the normal operation of the reactor 1, the cold fluid of the primary circuit 100 penetrates into the reactor 1 through the inlet 13; descends by gravity in the downcomer 16 to reach the bottom 12 of the vessel, rises inside the envelope 15 while passing through an aperture plate commonly called support plate 17; crosses the core 30 to extract heat derived from the fission and comes out of the reactor 1 through the outlet 14.

In the context of the implementation of the present invention, the cooling fluid derived from the secondary circuit 200 and which penetrates 801 into the vessel 10 via the circuit 100 therefore also descends along the wall 11 of the vessel 10 and reaches the liquid metal layer 72. Hence, this safety cooling fluid follows the natural route of water in the reactor 1. This cooling fluid comes into contact with the surface of the liquid metal layer 72. More specifically, the cooling fluid reaches the liquid metal layer 72 at the most critical location, i.e. at the interface between the latter and the wall 11 of the vessel 10. Hence, the cooling fluid ensures a cooling function over the entire periphery where the liquid metal layer 72 is likely to pierce the inner wall 11 of the vessel 10 by focusing effect. Hence, a cooling fluid supply from the downcomer 16 provides a particularly effective solution to reduce the risk of piercing of the vessel by focusing effect.

Also advantageously, this mode of contacting liquid water with the overmelting metal layer 72 is performed by run-off from the inner wall of the vessel 10, which is much softer than a heavy injection of water onto the corium bath. A heavy injection of water onto the corium bath could cause a steam shock which is detrimental to the integrity of the vessel of the reactor.

In FIG. 4, the cooling fluid is represented in the form of a body 802 spread over the free surface of the metallic layer 72. Naturally, when the latter is still not cooled down enough, the cooling fluid vaporises on contact with the metallic layer 72.

It should be noted that it is highly preferably to keep the depressurisation valves of the primary circuit 100 open, in order to evacuate steam produced upon contact of the cooling fluid derived from the secondary circuit 200 with the liquid metal layer 72.

Moreover, the depressurisation of the primary circuit 100 facilitates the injection of the cooling fluid from the secondary into the vessel 10.

Thus, this cooling fluid allows cooling down the liquid metal layer 72 when the latter has a thickness $e_{72}$ that is thin enough to concentrate the thermal power of the bath 72 on a too reduced surface such that it could pierce the inner wall 11 of the vessel 10.

Pouring of this cooling fluid is carried on until the thickness $e_{72}$ of the liquid metal layer 72 is large enough for the thermal power of this layer 72 to be transmitted over a larger surface and therefore the power per surface area is low enough to prevent piercing of the inner wall 11 of the vessel 10.

As illustrated in FIG. 4, it is also provided for a cooling of the outer wall of the vessel 10. For this purpose, it is possible to soak the well 603 of the vessel 10, i.e. water is injected or poured between the vessel 10 and the well 603. This cooling is usually sufficient in case of an IVR-type (in-vessel retention) accident, yet naturally not if the focusing effect phenomenon appears.

Indeed, cooling from outside the vessel by soaking the well 603 of the vessel 10, allows, for example, extracting 1 Megawatts per square meter (1 MW/m$^2$). In a focusing effect situation, this cooling is no longer enough, since it is necessary to be able to extract 1.5 MW/m$^2$, and even 2 MW/m$^2$, in the area in which the focusing effect creates a piercing of the vessel 10.

According to a non-limiting example, to soak the well 603 of the vessel 10, it is possible to use the water contained in a tank, for example in the fuel loading pool. This tank could be used in the building of the reactor or outside the latter. Preferably, at least one portion of this tank shall be disposed high enough with respect to the vessel 603 to enable a flow into the latter by gravity. Most often, at least one portion of this tank shall be located above the cap or cover 20 of the reactor 1.

According to one embodiment, the flow rate of the cooling fluid derived from the secondary circuit 200 is not monitored. In contrast, modelling of this flow rate can be easily computed once the pressure of the secondary circuit 200, and optionally of the primary circuit 100, is known. It is primarily the initial water stock of the steam generators 210, and the section $S_{breach}$ of the passage(s) between the secondary circuit 200 and the primary circuit 100 that determines the cooling duration. The calculations show that a quite limited portion of this total stock of the steam generators 210 is enough to sufficiently cool down the overmelting metallic layer 72, and avoid piercing of the vessel 10, while the metallic layer 72 at the surface sufficiently thickens.

Typically, the safety device is configured so that the passage section $S_{breach}$ of the passage(s) between the secondary circuit 200 and the primary circuit 100 enables the secondary water to come into the vessel 10 with a flow rate lower than 10 kg/s and preferably lower than 7 kg/s. Typically, this flow rate is comprised between 4 and 5 kg/s for an initial pressure (that is to say before opening of the passage(s) towards the primary circuit 100) in the steam generator (GV) in the range of 68 bar.

This allows having a sufficient cooling of the liquid metal layer over a duration long enough to avoid piercing of the vessel.

According to a non-limiting example, in order to monitor this cooling time, it is possible to provide for finely calibrating the section $S_{breach}$.

According to one example, $S_{breach}$ is smaller than 20 cm$^2$ (10$^{-2}$ meters). Preferably, $S_{breach}$ is larger than 2 cm$^2$. According to one example, $S_{breach}$ is comprised between 2 cm$^2$ and 20 cm$^2$. Advantageously, it is comprised between 2 cm$^2$ and 7 cm$^2$.

Figure 7:
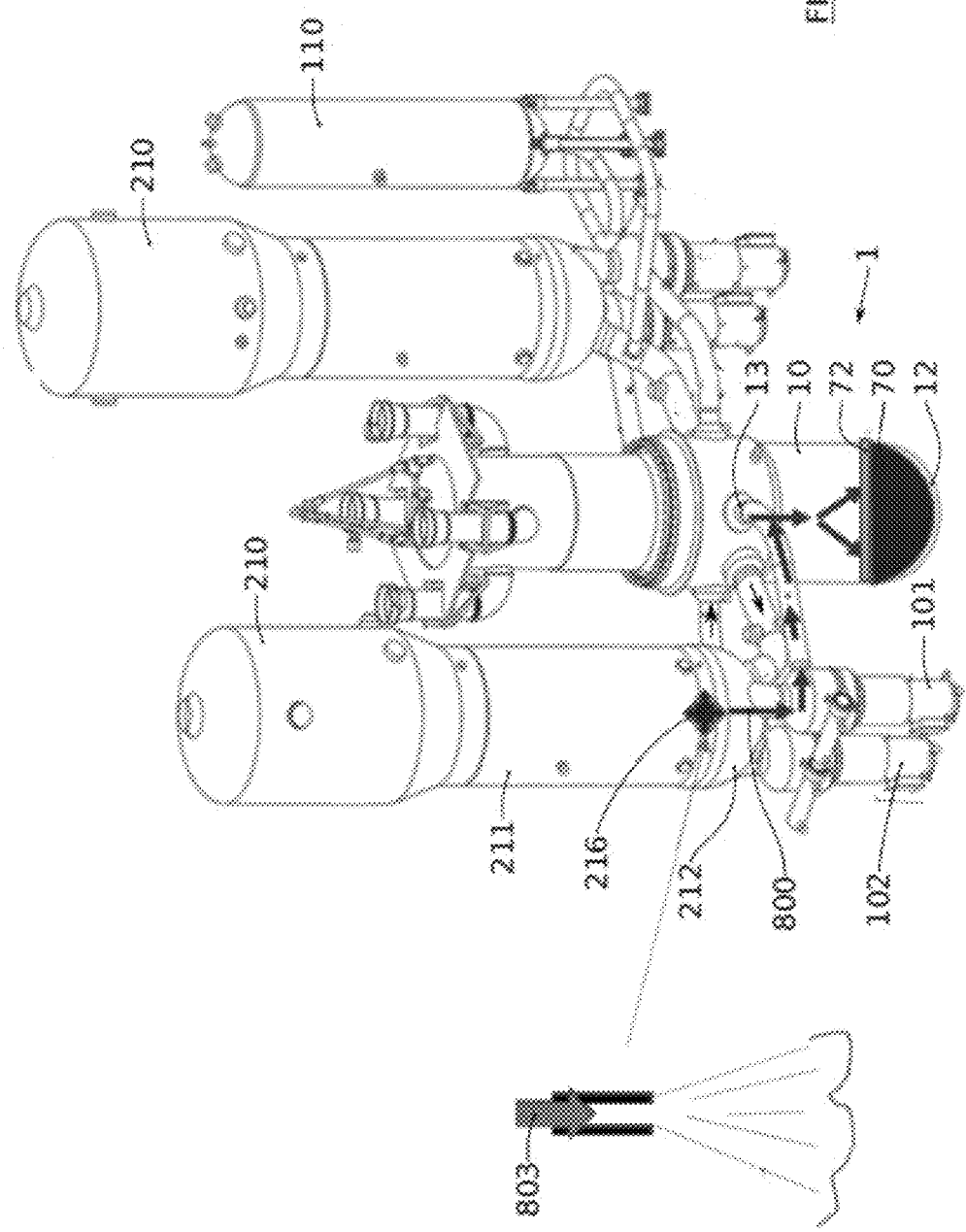
FIG. 7 is a diagram illustrating the operation of the invention in a perspective view of a solution implementing the embodiment illustrated in FIGS. 5A and 5B.
Figure 8:
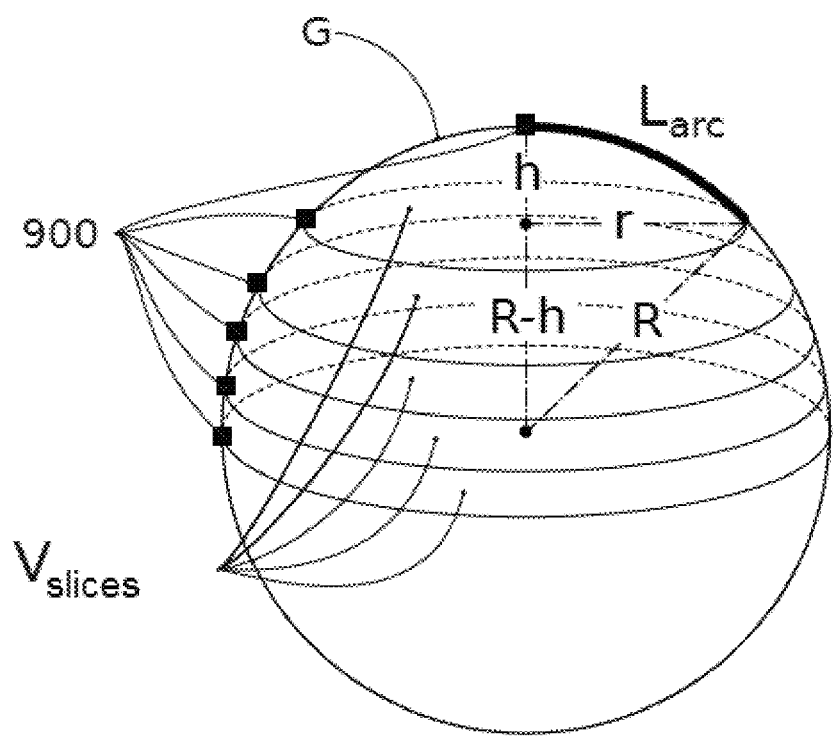
FIG. 8 illustrates, in a very schematic way, a vessel portion and the parameters allowing positioning fuses along a generatrix of the vessel.

$S_{inlet}$ is the minimum passage section between the primary circuit 100 and the inlet 13 of the vessel 10. Typically, it therefore consists of the minimum section for the passage of the primary fluid during normal operation of the reactor. For example, $S_{inlet}$ corresponds to the section of the inlet 13 in the vessel. This section is illustrated in FIG. 8. If there are several inlets of the primary circuit 100 in the vessel 10, for example as illustrated in FIG. 7, then $S_{inlet}$ is the sum of all inlets of the vessel 10.

$S_{breach}$ is the section of the passage, or the sum of the sections of the passages when there are several passages, setting the secondary fluid present in the at least one steam generator 210 in fluidic communication with the primary circuit 100.

The inlet section on the cold branch side of the reactor vessel is much larger than the section of the breach created between the secondary circuit and the primary circuit. Typically, according to a non-limiting example, $S_{breach}<0.05*S_{inlet}$ and preferably $S_{breach}<0.01*S_{inlet}$ and preferably $S_{breach}<0.005*S_{inlet}$.

Typically, the passage section of the primary fluid on the cold branch side is in the range of 6000 cm$^2$.

Typically, the pressure of the water contained in a steam generator 210 is in the range of 60 to 70 bars. In turn, the primary circuit 100 is depressurised. Indeed, devices for opening valves at the level of the pressuriser 110 are actuated to depressurise the primary circuit 100, should a serious accident arise. This allows avoiding ejections of fission products of the core under pressure in case of piercing of the vessel. Moreover, this depressurisation of the primary circuit allows facilitating the injection of the secondary inside the vessel 30.

In most scenarios leading to the serious accident, the secondary circuits are closed and isolated, on the one hand, by the closure of the Steam Injection lines leading to the turbine and, on the other hand, by the Atmospheric Discharge Valves.

According to one example, triggering of the safety device is performed by an operator. In order to determine the time point at which the fluid of the secondary circuit 200 should be poured into the primary circuit 100, it is advantageous to be able to estimate the height of the corium bath and preferably the profile of the evolution of this height.

To this end, it is possible to provide for one or several fuse(s) 900 disposed over the wall of the vessel 10. These are configured so as to melt down when a threshold temperature Tf is applied to these fuses 900. Typically, this temperature Tf is reached when corium forms in the vessel 10 and comes into contact with the fuses 900. When the temperature within the vessel corresponds to the normal operation of the reactor, the fuses 900 do not melt down. According to one example, Tf>400° C., preferably Tf 500° C., preferably Tf≥600° C.

When a fuse 900 melts down, it prevents the passage of an electric signal. The resistance of the circuit integrated to this fuse is therefore infinite.

The fuse comprises a core made of an electrically-conductive material and a sheath which is electrically-insulating. Thus, a short-circuit between the metallic vessel and the conductive core is avoided.

For example, the core is made of a metal such as aluminium whose melting point is close to 600° C., or of antimony. For example, the insulating sheath is made of a ceramic.

For example, the fuse forms a cable having two ends connected to the safety device and an elbow located between these two ends. The elbow corresponds to the lowermost point of the fuse. Thus, when the fuse switches from a conductive configuration, in which the current flows in the core from one end to another (resistance R1) into a non-conductive configuration in which the current no longer flow in the core from one end to another (resistance R2>R1, preferably infinite R2), this means that the corium bath has molten the elbow. Thus, it is deduced that the height of the free surface of the corium bath corresponds to the height of the elbow of the fuse 900 with respect to the bottom of the vessel 10.

The use of a fuse turns out to be much more robust and reliable than the use of temperature sensors.

Preferably, the fuse is positioned on the inner wall 11 of the vessel 10. This allows enhancing the reliability of the detection of the apparition of the Focusing effect. Indeed, by placing the fuse on the outer wall of the vessel 10, the temperature measurement will essentially depend on the boiling temperature of water in contact with the wall of the vessel, which does not allow effectively detecting the rise of the corium bath, as well as the formation of the Focusing Effect layer.

Preferably, the safety device comprises a series of fuses 900 positioned along at least one generatrix of the inner wall 11 of the vessel 10. Preferably, the fuses are positioned along at least two generatrices. Thus, if a corium stream occurs along a generatrix, fuses placed at the upper portion might be reached and not characterise the progressive rise of the corium bath at the bottom of the vessel.

Preferably, for each generatrix, a series of fuses 900 is disposed over a generatrix of the hemispherical portion forming the bottom 12 of the vessel 10, the latter and another portion of the fuses is disposed over a lateral wall of the vessel 10.

These fuses allow determining the time point at which the corium bath 71 starts forming as well as the time point at which water from the secondary should be injected into the primary circuit 100.

For example, depending on the profile of evolution of the height of the corium bath, which height of the corium bath is estimated according to the signals sent by the fuses, it is possible, by simulation, to decide on the most appropriate time to trigger the injection of water from the secondary into the primary circuit 100.

The profile of evolution of this temperature also allows detecting the rise of the corium level in the vessel 10. This profile also allows detecting the beginning of piercing of the latter by the liquid metal layer 72.

For example, it is possible to provide for fuses 900 of the same generatrix, or for fuses 900 of two different generatrices, having different melting temperatures. For this purpose, it is possible to provide for different materials for the sheath and/or the core of the fuses. It is preferably to provide for a device that is fully dismountable and replaceable, for example during a ten-year inspection, in order to be able to have a set that is essential for safety whose service life does not exceed 10 years of reactor operation.

According to a particularly advantageous example, it is desired to position corium bath height detectors so that the rate of rise of the corium bath is revealed by the fuses. This allows monitoring more accurately the time point at which the focusing effect could occur and the time point at which the fluid of the steam generators 210 should be poured into the primary circuit 100. Thus, this positioning of the fuses 900 is performed so that the volumes $V_{slice}$ of the core slices located between two consecutive or neighbouring fuses 900 are constant.

More specifically, two neighbouring fuses according to a vertical distribution, define a vessel slice. This vessel slice is delimited, on the one hand, by the inner wall 11 of the vessel 10 and, on the other hand, by two vertical planes, each vertical plane passing through one of these neighbouring fuses 900. At least some, preferably all, of the volumes of the vessel slices are identical. Preferably, the neighbouring fuses according to a vertical distribution are disposed according to the same curve preferably forming a generatrix of the vessel 10.

FIG. 8 shows, in a very schematic way, a portion of the vessel 10, as well as fuses 900 disposed according to a generatrix G. The fuses 900 define slices with substantially equal volumes $V_{slice}$.

Thus, if the rate of formation of the corium bath (and therefore the rate of formation of the corium volume) is constant, the fuses of the same generatrix are reached by the corium bath with identical time intervals between two successive fuses of this generatrix.

Referring to FIG. 8, an example of calculation of the position of the fuses will now be described.

In this example, the fusible detectors are placed along 2 to 4 generatrices evenly distributed around the axis of the hemispherical bottom of the vessel 10. Thus, for a number of generatrices equal to 2, 3 and 4 respectively, these generatrices will be separated by an angle of 180°, 120° and 90° respectively.

It is considered that the bottom of the vessel 10 is formed by a sphere portion, the sphere having a 4-meter diameter.

It is desired to position corium bath height detectors corresponding to 3, 6, 9, 12 and 15 m³ of spilled corium. This allows determining the profile of the corium bath rise. By having a clear picture of the variation of the rate of rise of the corium bath, the operator (or the automatic safety device) could determine which time is the most appropriate to trigger the injection of water of the steam generators 210 into the primary circuit 100.

The total filling of the hemispherical bottom is 16.75 m³.

In FIG. 8, the following parameters are referenced:
R=radius of the hemispherical portion of the vessel,
h=height of the fuse with respect to the bottom of the vessel,
$L_{arc}$ length, along the wall of the vessel, between the bottom of the vessel and the position of the fuse
r=distance between the axis of the cylinder of the cylindrical portion of the vessel 10 (namely the axis, passing through the centre of the sphere and which is perpendicular to the plane P).

The plane P corresponds to the junction between the hemispherical portion of the vessel and the lateral walls of the vessel extending according to a cylinder.

The volume $V_{cap}$ of the hemispherical portion of the cube could be calculated according to the following equation:

$$V_{cap} = \frac{\pi h^2 (3R - h)}{3}$$

The position of a fuse may be determined according to the value $L_{arc}$ calculated according to the following equation:

$$L_{arc} = \arccos\left(\frac{R - h}{R}\right) * R$$

Should it be desired to dispose five fuses on each generatrix, the fuses may be disposed in the following manner in order to have a correspondence between the rise speed of the corium bath, and the meltdown of these fuses:

fuse No. 1: height h=0.738 m; $L_{arc}$=1.776 m;
fuse No. 2: height h=1.079 m; $L_{arc}$=2.185 m;
fuse No. 3: height h=1.362 m; $L_{arc}$=2.492 m;
fuse No. 4: height h=1.617 m; $L_{arc}$=2.756 m;
fuse No. 5: height h=1.860 m; $L_{arc}$=3.002 m.

Alternatively, it is possible to control the setup of the communication of the secondary circuit 200 with the primary circuit 100 based on a timetable starting from the time point where the formation of the corium bath 71 is detected thanks to the fuses 900.

By simulation, it is possible to determine well ahead that we have a duration D1 between the beginning of the formation of the corium bath 71 and the beginning of the formation of the liquid metal layer 72 at the origin of the piercing of the vessel 10. Naturally, this duration varies from one reactor to another. For some reactors, this duration D1 is about one hour. The operator shall activate the safety device at the time point t1, with t1=t0+(D1−k1), k1 being a safety factor to ensure that the secondary water is poured over the liquid metal layer 72 early enough to avoid a considerable weakening of the vessel 10, and preferably to avoid the beginning of piercing of the vessel. For example, k1 is comprised between −5 minutes and 15 minutes.

By simulation, it is also possible to determine the duration D2 between the beginning of the formation of the corium bath 71 and the time point t2 at which the liquid metal layer 72 has a thickness $e_{72}$ that is large enough to make it impossible to pierce the vessel 10.

The passage section of the passage(s) between the secondary circuit 200 and the primary circuit 100 is dimensioned so as to enable pouring, between the time points t1 and t2, a flow rate Qmin that is sufficient to cool down the liquid metal layer 72.

As indicated hereinabove, it is highly advantageous that the fluid 800 derived from the secondary circuit and which is poured over the overmelting metal layer 72 descends by running off along the wall 11 of the vessel 10. Nevertheless, alternatively or in combination with this embodiment, it is possible to provide for this fluid 800 reaching the inside of the vessel 10 by penetrating into the latter through the outlet orifice 14.

FIGS. 5A to 7 illustrate different embodiments allowing injecting the fluid of the secondary circuit 200 into the vessel 10, via the primary circuit 100.

The solutions of all these embodiments consist in setting the secondary circuit 200 in communication with the primary circuit 100. This communication is performed thanks to a safety system configured so as to break up intentionally a containment barrier that isolates these two circuits 100, 200. It should be recalled that, during a normal operation, that is to say in the absence of incidents and during the phase of electricity production of the plant, the primary 100 and secondary 200 circuits are fluidly insulated from one another.

A first embodiment is illustrated by FIGS. 5A to 7.

In this embodiment, the hydraulic connection between the secondary circuit 200 and the primary circuit 100 consists of a hydraulic connection internal to the steam generators 210.

A steam generator 210 forms an enclosure which encloses the fluid of the secondary circuit 200 and at the same time encloses at least one pipe 214 through which the fluid of the primary circuit 100 circulates. Thus, the fluid of the secondary circuit 200 comes into contact with an outer wall of the pipe 214.

According to a first solution, the safety system comprises a device which allows creating at least one breach between the inside of said pipe 214 and the fluid of the secondary circuit 200 present in the enclosure of the steam generator 210.

Thus, the breach forms said passage enabling the injection of the secondary water into the primary circuit 100.

Figure 5A:
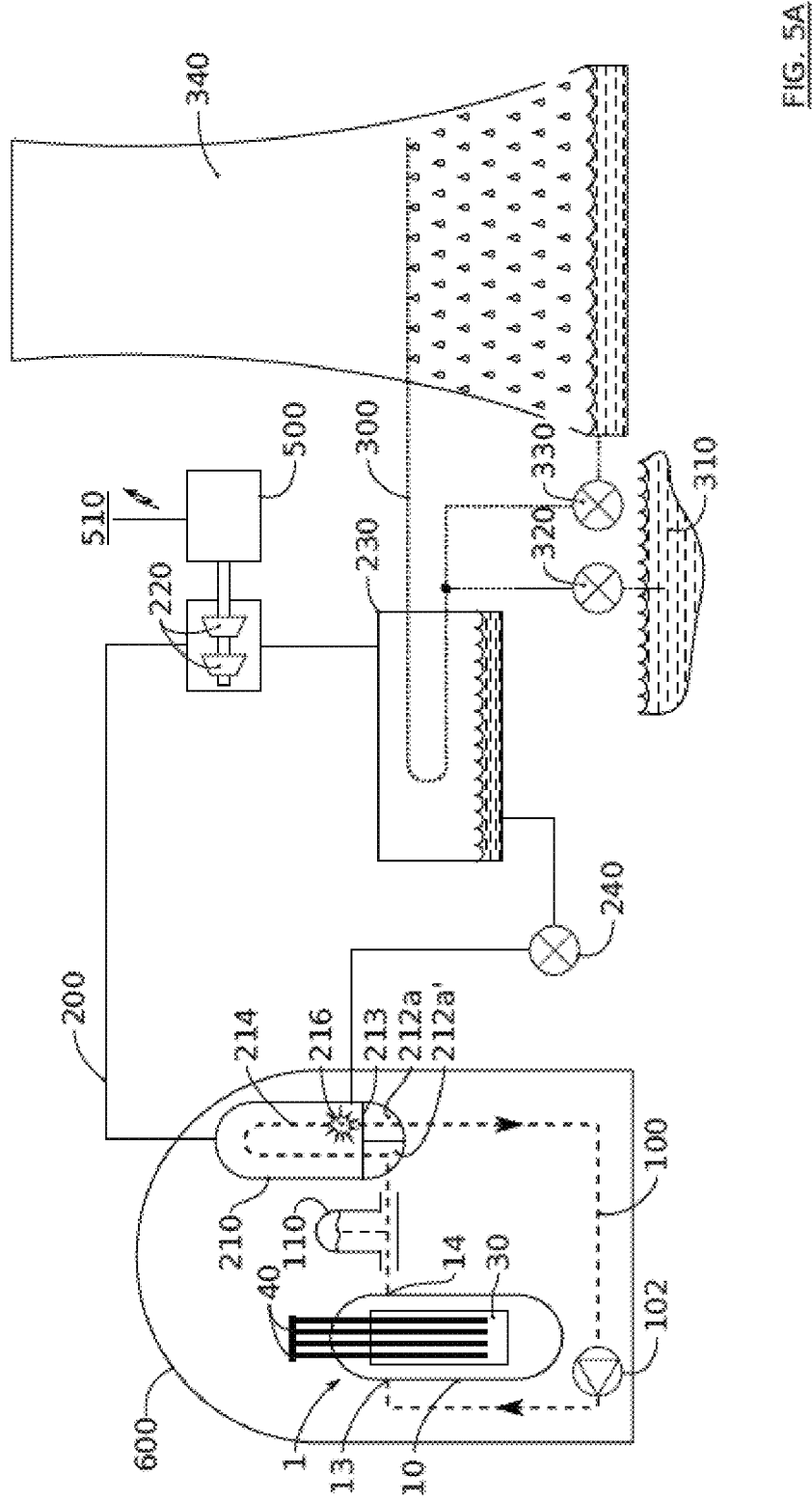
Figure 5B:
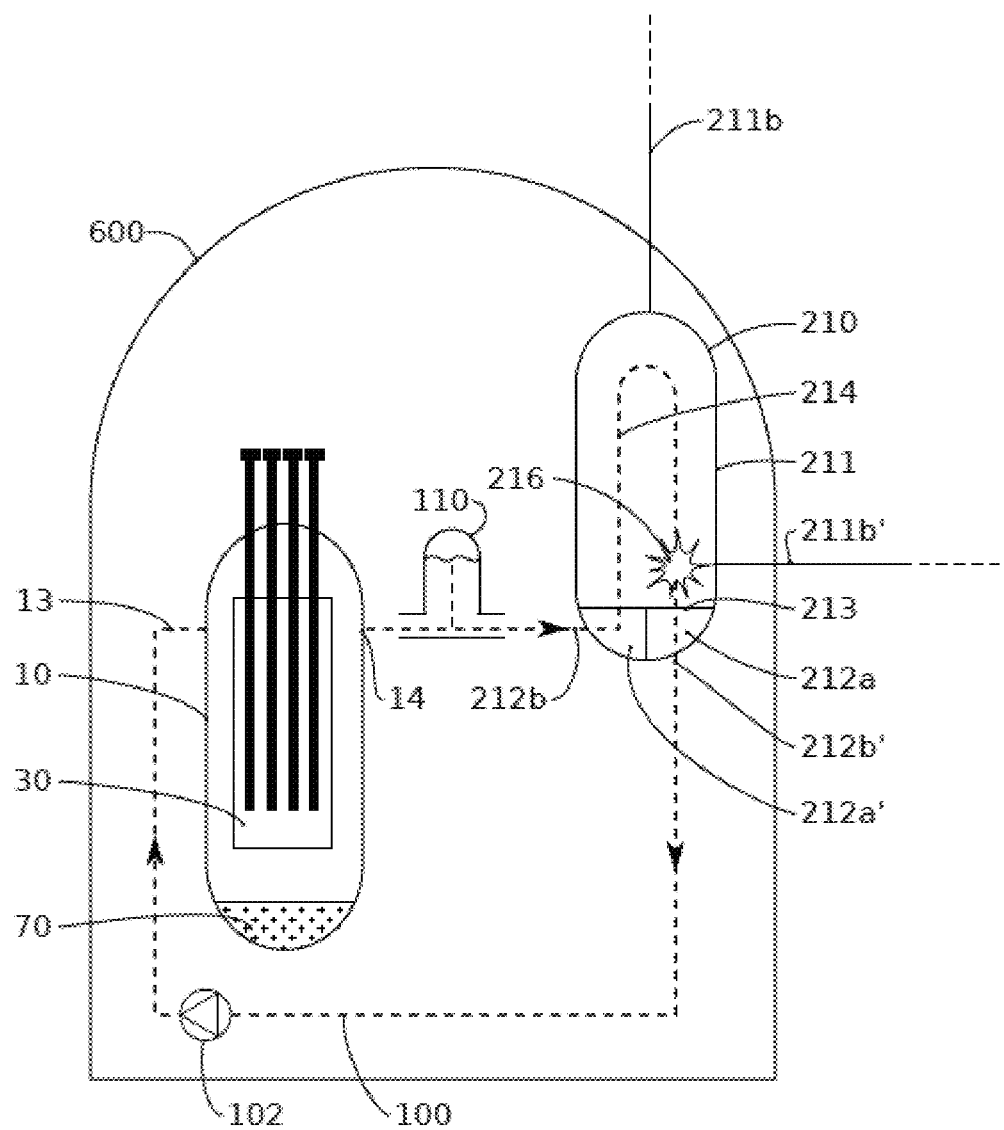

This solution is schematically illustrated in FIG. 5B. It will be described in detail, in the form of several variants, with reference to FIGS. 6A to 7.

Figure 6A:
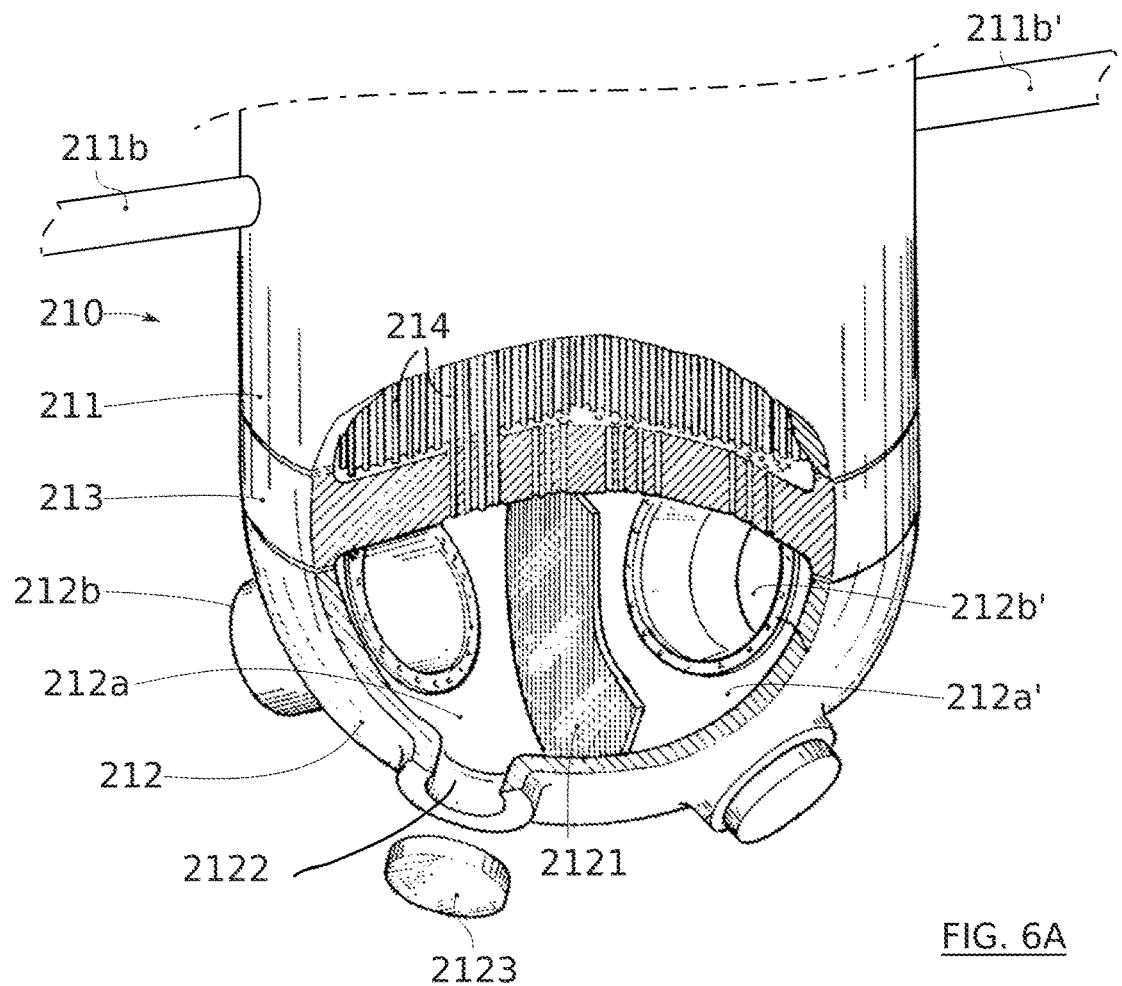
FIGS. 6A to 6D are detail views of a non-limiting example corresponding to the first embodiment represented in a more general way in FIGS. 5A and 5B enabling the injection, within a steam generator, of secondary water inside the primary circuit.

FIG. 6A illustrates a lower portion of the steam generators 210. This steam generator 210 comprises an envelope 260 with a generally cylindrical shape. This envelope 260 defines an upper portion 211, having openings 211b, 211b' in communication with the secondary circuit 200 and a lower portion 212 having openings 212b, 212b' in communication with the primary circuit 100. The upper 211 and lower 212 portions are separated by a plate 213 with tubes. A lower face of the plate 213 with tubes delimits with the lower portion 212 a volume forming a water box. Preferably, the water box has a hemispherical shape. It is separated into two portions 212a, 212a' by a partition 2121.

The portion 212a has an opening 212b hydraulically connected to the inlet 13 of the vessel 10. The portion 212a' has an opening 212b' hydraulically connected to the outlet 14 of the vessel 10. Thus, the portions 212a and 212b, as well as the tubes 214, are part of the primary circuit 100.

Pressurised water at high temperature coming from the core 30 of the nuclear reactor 1 at the outlet 14 of the vessel 10 penetrates into the portion 212a' of the water box and then circulates in the tubes 214 of the tube network of the steam generator 210. Indeed, the plate 213 with tubes carries a plurality of tubes 214 one end of which opens into the portion 212a' and another end of which opens into the portion 212a. Typically, these tubes 214 for inverted "U" shapes. These "U"-shaped tubes are soaking in the water of the secondary circuit 200 present in the upper portion 211 of the steam generator 210.

Thus, the pressurised hot water circulates, starting from the portion 212a' firstly from the bottom to the top, up to the top of the "U" elbow, and then from the top to the bottom to reach the portion 212a of the water box. Throughout this route, the water circulating in the tubes 214 transfers heat to the fluid of the secondary circuit 200 present in the upper portion 211 of the steam generator 210. Once it has reached the portion 212a of the water box, the water could then escape via the outlet 212b and return back to the inlet 13 of the vessel 10 to be heated up again by the core 30.

It should be noted that each of the portions 212a, 212a' of the water box is provided with a hatch opening 2122 closed by a plug 2123. This hatch opening 2122 has a dimension that is large enough to enable a human or a robot to access the inside of the water box.

In a particularly advantageous manner, the safety system comprises a device, also called member, configured so as to break up the insulation between the primary circuit 100 and the secondary circuit 200 inside the steam generator 210.

Typically, this device is an explosive device 216 configured so as to generate an explosion capable of creating a breach intentionally breaking up the hydraulic containment barrier between the primary circuit 100 and the secondary circuit 200. Preferably, this breach is created in the so-called cold portion of a pipe 214, that is to say downstream of the inverted "U" elbow. This allows facilitating the flow of the secondary fluid by gravity in the primary circuit 100. In addition, this breach is preferably located as low as possible according to a vertical axis, that is to say ideally immediately proximate to the plate with tubes 213, that being so in order to favour a flow by gravity of all of the secondary water contained in the steam generator 210.

Figure 6B:
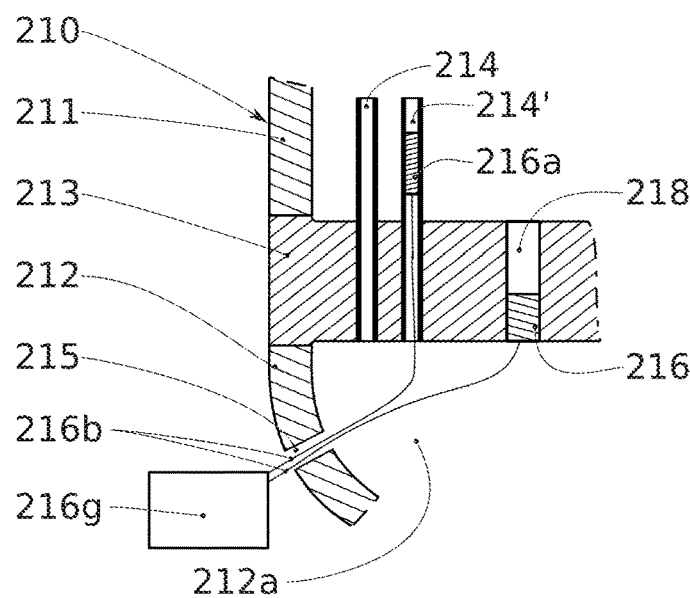

According to a first embodiment, this device, bearing the reference numeral 216 in FIG. 6B, comprises an explosive plug 216a accommodated inside a tube 214'. Preferably, this tube 214' is identical to the tubes 214 of the plate 213 with tubes, which considerably simplifies the manufacture of the steam generator 210.

The explosive plug 216a is inserted into the tube 214', above the plate 213 with tubes. When activated, the explosive plug 216a sections at least the tube 214' in which it is accommodated. The inside of this tube 214' is then in fluidic communication with the water of the secondary circuit 200 present in the upper portion 211 of the steam generator 210.

This water then spills out rapidly into the water box, and then into the primary circuit 100, to reach the vessel 10 and the core 30 of the reactor 1. This water is rapidly directed into the reactor 1 by the effect of pressure prevailing in the steam generator 210. Indeed, it should preferably be recalled that the steam generator 210 is hydraulically isolated very quickly in the event of an accident, thereby trapping the water masses contained therein and preserving therewithin the pressure prevailing therein.

According to this embodiment, if only one tube 214 is sectioned, then the section $S_{breach}$ is substantially equal to the section of the tube 214 that has been sectioned if several tubes 214 are sectioned $S_{breach}$ is substantially equal to the sum of the sections of the sectioned tubes 214. The section $S_{breach}$ is dimensioned so that the secondary water flows into the vessel in a monitored manner, as indicated before.

In the diagram of FIG. 6B, the water present in the upper portion 211 spills out into the portion 212a of the water box. Preferably, the latter is hydraulically connected to the inlet 13 of the vessel 10, which enables the water to reach the overmelting metallic layer by descending through the downcomer 16, thereby conferring the above-mentioned advantages.

A hole 215 for the tight passage of the control wires 217b of the explosive device 216 shall be created in a wall of the heat generator 210. Thus, these control wires 217b have one end accessible from outside the steam generator 210 to trigger the explosion. These wires 217b are installed during the set-up of the explosive device 216.

Figure 6C:
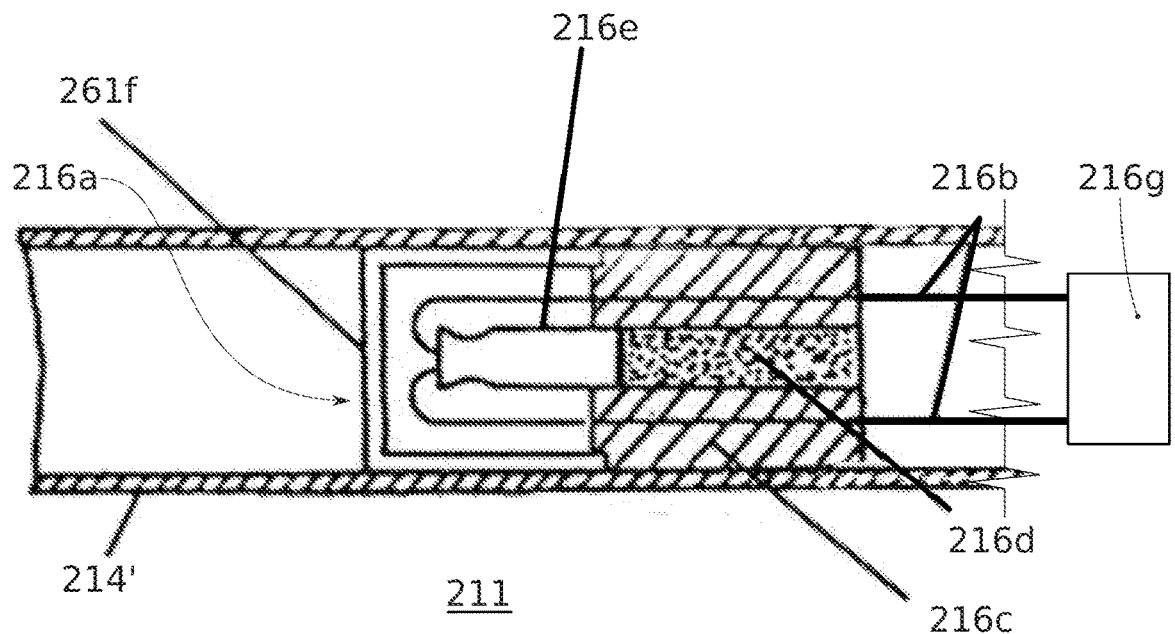
Figure 6D:
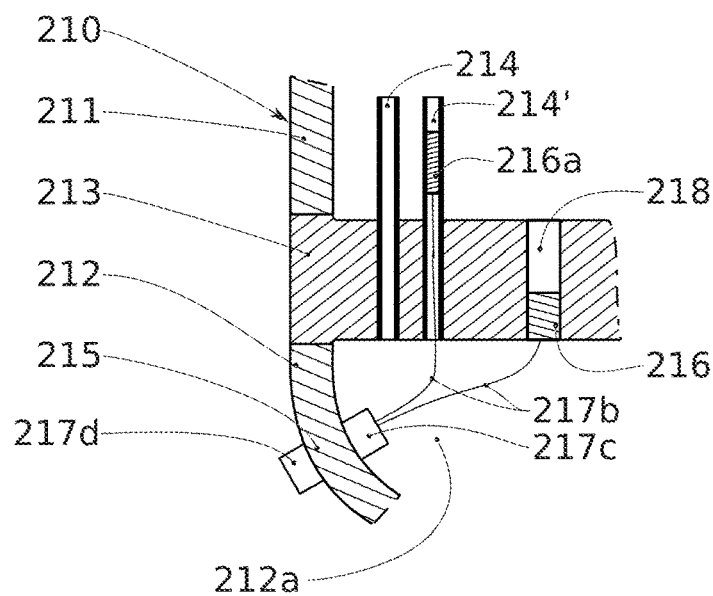

According to one variant shown in FIG. 6D, the safety system comprises, besides the explosive plug 216a, a thermowell, a magnetic connector and a magnetic exciter to trigger the explosion. The thermowell has a portion which extends inside the steam generator 210 up to the explosive plug 216a. This portion comprises a magnetic contactor 217c and a wire 217b connecting the magnetic contactor 217c to the explosive plug 216a. The thermowell has a portion accessible from outside the steam generator 210. This portion carries or is accessible from a magnetic exciter 217d configured so as to activate the contactor. When the magnetic contactor 217c is activated, it triggers the explosion of the explosive plug 216a.

In this case, the thermowell is preferably made of an a magnetic material.

An advantage of this solution is to avoid a wire passing through a wall of the steam generator 210 which simplifies sealing of the system.

Naturally, it is possible to provide for equipping several tubes 214' with an explosive device 216 in order to introduce a redundancy and reduce any risk of malfunction of an explosive plug 216a. This also allows increasing the overall section $S_{breach}$ of passage of the fluid of the secondary circuit 200 inside the primary circuit 100.

It is also possible to provide for integrating several explosive devices 216 in the same tube 214' in order to introduce a redundancy and reduce any risk of malfunction of an explosive plug 216a. For this purpose, the control wires 216b of the uppermost tubes 214' shall remain accessible during the set-up of the devices placed at a lower level.

The explosive device 216 may be placed during the manufacture of the steam generator 210. Alternatively, this solution may also be deployed on steam generators of plants in activity. For this purpose, it is proceeded with an operation of plugging a tube 214 or several tubes 214 already existing with an explosive plug 216a.

This embodiment has the advantage of introducing no additional element into the steam generator 210. Indeed, the explosive device is integrated into one of the tubes existing in conventional steam generators 210.

An example of an explosive device 216 is illustrated in FIG. 6C. In this figure, a tube 214' sealed by an explosive plug 216a is represented. The explosive plug 216a comprises a body 216c inside which a main charge 216d and at least one portion of a detonator 216e are accommodated. The detonator 216e is in contact with the charge 216d. Preferably, the body 216c is made of a material transmitting the exploiting or comprises such a material. One or several wire(s) 216b connect the detonator 216e to a triggering device 216g accessible from outside the steam generator 210. Preferably, a protective envelope 216f isolates the detonator and the charge.

FIG. 6B illustrates, at the right-side portion, another alternative embodiment of the explosive device 216.

In this example, an open-through passage channel 218 is provided, formed in the plate 213 with tubes, and setting the secondary water enclosed in the upper portion 211 and the primary water enclosed in the lower portion 212 of the water box, preferably the portion 212a connected to the inlet 13 of the vessel 10, in communication. This passage channel 218 is sealed by an explosive device 216. For example, this explosive device 216 may be identical to the previously-described explosive plug 216a.

An advantage of this embodiment is that the section $S_{breach}$ is defined by the initial section of the channel 218. Yet, this channel 218 section is perfectly controlled. This allows monitoring the velocity and the duration of the flow of the secondary fluid inside the vessel 10 more accurately.

Naturally, for this purpose, the explosive load must be large enough to entirely extract the plug 216 off the channel 218.

It should be noted that the same steam generator 210 may comprise explosive devices 216 of different types, as illustrated in FIG. 6B. Most often, the same steam generator 210 will comprise one single explosive device 216 or several explosive devices 216 of the same type.

FIG. 7 illustrates, in perspective view, the solution of the embodiment of FIGS. 5A and 5B. In this figure, the core 1 of the reactor is shown, with the vessel 10 whose bottom 12 contains the corium 70 bath. A booster 110 to pilot and increase the pressure of the primary circuit 100 is also illustrated. Pipes hydraulically connect the vessel 10 with steam generators 210, two in number herein.

For each steam generator 210, the vessel 10 is fed via two inlet pipes. On each of these inlet pipes, a pump 101, 102 is disposed between the steam generator 210 and the vessel 10 to make the fluid of the primary circuit 100 circulate.

These pumps 101, 102 lie on the passage of the fluid 800 derived from the secondary circuit 200 upon triggering of the explosive device 216.

In this example, the pumps 101, 102 are of the immersed rotor type. Indeed, the rotors of these pumps lie vertically lower than the fluid passage circuit. This pump type allows avoiding the presence of a "U"-shaped branch in the pipe connecting the steam generator 210 to the inlet 13 of the vessel 10. This allows facilitating the liquid flow by gravity, down to the cold portion of the vessel 10, of the water derived from the secondary circuit 200. As indicated before, this gravity flow along the downcomer 16 improves the efficiency of cooling of the liquid metal layer 72 at the origin of the piercing of the vessel 10 by focusing effect. Hence, the solution, illustrated in FIG. 7, has a significant advantage.

This FIG. 7 also illustrates spraying in the form of a jet (spray) 803 that occurs upon expansion of the secondary water into the primary circuit 100 upon break-up of the fluidic containment barrier.

It should be noted that the invention also applies in the case where the pipe of the primary circuit 100 has a "U"-shaped branch between the steam generator 210 and the vessel 10.

Assuming a break-up of a tube 214 of the steam generator 210, or a piercing of a hole of the plate 213 with tubes on the cold side 13 of the primary circuit 100, the presence of a "U"-shaped branch upstream of the primary motor pump 101 is detrimental to the liquid gravity injection from the created breach until spilling out in the downcomer 16. Nonetheless, the spray 803 created by the breach upon the expansion conveys a liquid fraction along the return circuit up to the downcomer 16. Nonetheless, the presence of the "U"-shaped branch prevents a purely liquid flow by gravity down to the layer 72 to be cooled down. Nonetheless, the steam created by the secondary water tends to propagate preferably on the cold side down to the downcomer 16, rather than rising through the set of tubes 214 of the steam generator 210 and then descending and returning back to the vessel 10 on the hot side 14, which promotes cooling down of the liquid metal layer 72 at the origin of the piercing of the vessel 10 by focusing effect. This cooling is not as efficient as a purely liquid flow by gravity by running off, since it is then a steam and spray mixture that comes into contact with the entire metal surface present in the downcomer 16. To obtain a solely liquid flow by gravity, it is necessary to wait until the "U"-shaped branch is totally filled with liquid for the excess water to then start spilling out in the volute of the pump 101 of the primary circuit 100, and then towards the cold branch with the inlet 13 of the vessel 10, and finally in the downcomer 16. A primary pump geometry with an immersed rotor, without any "U"-shaped branch as illustrated in FIG. 7 and mentioned hereinabove, is therefore preferred to obtain an optimum water injection efficiency from a break-up of a tube 214 of the steam generator 210, since the purely liquid flow by gravity is favoured.

Considering the foregoing description, it clearly appears that the invention provides a reliable and robust solution to considerably improve the safety of a PWR-type nuclear reactor, in particular in case of loss of coolant from the primary circuit.

Advantageously and as described hereinabove, the communication point between the primary circuit and the secondary circuit is selected such that the propagation of secondary water towards the primary circuit takes place almost exclusively on the cold branch side of the primary circuit. Thus, the water of the steam generators will follow the primary cold branches before flowing by gravity in the downcomer, where piercing of the vessel by focusing effects takes place.

The invention is not limited to the previously-described embodiments and extends to all embodiments covered by the claims.

Naturally, the invention is not limited to a reactor having the structure illustrated in FIG. 4 and numerous variants could be made to this reactor yet without departing from the scope defined by the claims.

In particular, only one inlet 13 and one outlet 14 are represented in the figures. Preferably, the reactor 1 comprises several inlets and several outlets. Preferably, it also comprises several steam generators 210.

The invention claimed is:

1. A pressurised water nuclear reactor comprising:
    a vessel accommodating a core, the vessel comprising at least one inlet and at least one outlet;
    a primary circuit at least one first end of which is connected to the inlet of the vessel and at least one end of which is connected to the outlet of the vessel so that a primary fluid circulating in the primary circuit penetrates into the vessel of the reactor through said inlet and comes out through said outlet while passing throughout the core in order to extract heat produced by the core;
    a secondary circuit comprising a circulating water-based secondary fluid separated from the primary fluid by fluidic insulation, and at least one steam generator, the secondary circuit being configured so as to absorb heat of the primary circuit and transform the heat of the primary circuit, at least partially, into steam in the steam generator, and
    a safety device comprising:
        at least one explosive device configured so as to explode in order to break up the fluidic insulation between the secondary circuit and the primary circuit and create a passage enabling the secondary coolant to flow into the primary circuit.

2. The reactor according to claim 1, wherein the passage has a section breach having an area between 0.2 $cm^2$ and 20 $cm^2$.

3. The reactor according to claim 1, comprising at least one fuse disposed on a wall of the vessel, the fuse being configured so that, when a liquid metallic layer at a surface of a corium bath formed in a bottom of the vessel reaches the fuse, the liquid metallic layer makes the fuse melt down, the melting temperature of the fuse being higher than or equal to a temperature threshold Tf, with Tf≥400° C.

4. The reactor according to claim 3, wherein the at least one fuse comprises a plurality of fuses distributed according to at least one generatrix of a wall of the vessel, the plurality of fuses are distributed along the at least one generatrix so that two neighbouring fuses according to the at least one generatrix, define a vessel slice, volumes slice of the vessel slices being identical.

5. The reactor according to claim 1, wherein the reactor comprises an inner envelope, located inside the vessel, enveloping the core and defining with an inner wall of the vessel an annular volume called downcomer, the downcomer being configured so that, during the normal operation of the reactor:
the inlet opens into the outside of the inner envelope and into the downcomer so that the primary fluid coming from the inlet is guided up to the bottom of the vessel,
the outlet opens into the inside of the inner envelope so that the primary fluid present in the core could come out of the reactor through the outlet,
the reactor being configured so that when the explosive device creates the at least one passage suppressing the fluidic insulation between the secondary circuit and the primary circuit, the secondary fluid contained in the steam generator then flows in a bottom of the vessel while passing beforehand through said inlet of the vessel and then through the downcomer.

6. The reactor according to claim 1, wherein the steam generator comprises an envelope enclosing the fluidic isolation, a part of the secondary fluid and a part of the primary fluid.

7. The reactor according to claim 6, wherein the triggering device comprises at least one wire crossing a wall of the envelope of the steam generator.

8. The reactor according to claim 6, wherein the triggering device comprises:
a magnetic contactor located inside the envelope of the steam generator and connected by a wire to the explosive plug, and
a magnetic exciter, located outside the envelope of the steam generator, configured so as to cooperate with the magnetic contactor so that when the magnetic exciter is activated, the magnetic exciter actuates the magnetic contactor which triggers the explosion of the explosive plug, thereby creating said passage.

9. The reactor according to claim 1, wherein the steam generator comprises tubes inside which the primary fluid circulates, the secondary fluid being in contact with an outer wall of the tubes, the explosive device comprising:
at least one explosive plug accommodated inside at least one of said tubes; and
a triggering device,
the at least one explosive plug being configured so as to explode, when the at least one explosive plug is triggered by the triggering device.

10. The reactor according to claim 9, wherein the triggering device is activated from outside the steam generator.

11. The reactor according to claim 1, wherein the steam generator comprises:
a first portion in which the primary fluid circulates,
a second portion in which the secondary fluid circulates,
a plate with tubes fluidly isolating the first and second portions, the plate with tubes comprising at least one tube extending, at least partially, in the second portion and inside which the primary fluid circulates, the secondary fluid present in the second portion being in contact with an outer wall of the tube,
the safety device comprising:
at least one communication channel between the first and second portions, the at least one explosive device including at least:
an explosive plug accommodated inside said channel and preventing the circulation of the fluid in said channel,
a triggering device,
the at least one explosive plug being configured so as to explode, when the at least one explosive plug is triggered by the triggering device, so as to destroy itself at least partially to enable a circulation through the passage in said channel.

12. A safety method for the pressurised water nuclear reactor according to claim 1, comprising:
detecting an at least partial meltdown of the core forming a corium bath having a surface liquid metallic layer in a bottom of the vessel; and
in response to the detecting, using the at least one explosive device to break-up the fluidic insulation and set the secondary circuit in fluidic communication with the primary circuit so that the secondary fluid flows inside the vessel over said liquid metallic layer of the corium bath.

13. The method according to claim 12, wherein said detecting is performed using at least one fuse disposed on a wall of the vessel, the at least one fuse being configured so as to melt down when the liquid metallic layer reaches the at least one fuse.

14. The method according to claim 12, wherein the secondary fluid flows inside the vessel over the liquid metallic layer for at least thirty minutes.

15. The method according to claim 12, wherein the secondary fluid flows inside the vessel with a flow rate lower than 10 kg/s ($10^3$ grams/second).

* * * * *